United States Patent [19]
Fenton

[11] Patent Number: 5,404,849
[45] Date of Patent: Apr. 11, 1995

[54] SPHERICAL ENGINE

[76] Inventor: John W. Fenton, 26 Shoreland Dr., Key Largo, Fla. 33037

[21] Appl. No.: 25,919

[22] Filed: Mar. 3, 1993

Related U.S. Application Data

[63] Continuation-in-part of Ser. No. 804,971, Dec. 11, 1991, abandoned.

[51] Int. Cl.6 .......................... F02B 53/00; F01C 3/06
[52] U.S. Cl. ........................................ 123/241; 418/68
[58] Field of Search ............................ 123/241; 418/68

[56]  References Cited

U.S. PATENT DOCUMENTS

| | | | |
|---|---|---|---|
| 1,952,260 | 3/1934 | Kempthorne | 418/68 |
| 2,043,544 | 6/1936 | Kempthorne . | |
| 2,069,646 | 2/1937 | Cohen . | |
| 3,184,154 | 5/1965 | May . | |
| 4,021,158 | 5/1977 | Bajulaz | 418/52 |
| 4,024,841 | 5/1977 | Smith | 123/8.45 |
| 4,519,756 | 5/1985 | Fenton | 418/68 |
| 4,589,388 | 5/1986 | Fenton | 123/241 |
| 4,688,522 | 8/1987 | McMaster | 123/241 |
| 4,721,079 | 1/1988 | Lien | 123/241 |

FOREIGN PATENT DOCUMENTS

| | | | |
|---|---|---|---|
| 145206 | 11/1980 | Germany | 418/68 |
| 909309 | 2/1982 | U.S.S.R. | 418/68 |

Primary Examiner—Michael Koczo
Attorney, Agent, or Firm—Frank L. Kubler

[57] ABSTRACT

An engine includes an engine block containing a spherical compartment with an equatorial zone removed to create an annular gap, a ring member slidably encircling the annular gap having an outer surface and having an opening to permit the passage of combustion gases which periodically aligns with a port in the engine block, a hinge pin mounted within the ring member and extending through the center point of the sphere, first and second divider members, each having a connecting end and a free end, the connecting end of which includes a tube section which surrounds the hinge pin, and the free end of which is directed toward, abuts and conforms to the sphere surface which, together, separate the sphere into two combustion chambers having variable volumes, such that as one combustion chamber expands the other combustion chamber correspondingly contacts, a slot in the surface of the free end of each divider member extending parallel to the longitudinal axis of the hinge pin, a fulcrum member projecting from the sphere into each slot to guide the divider members, an ignition mechanism mounted in the sphere to ignite a fuel air mixture within the sphere alternately on either side of the dividing members.

22 Claims, 15 Drawing Sheets

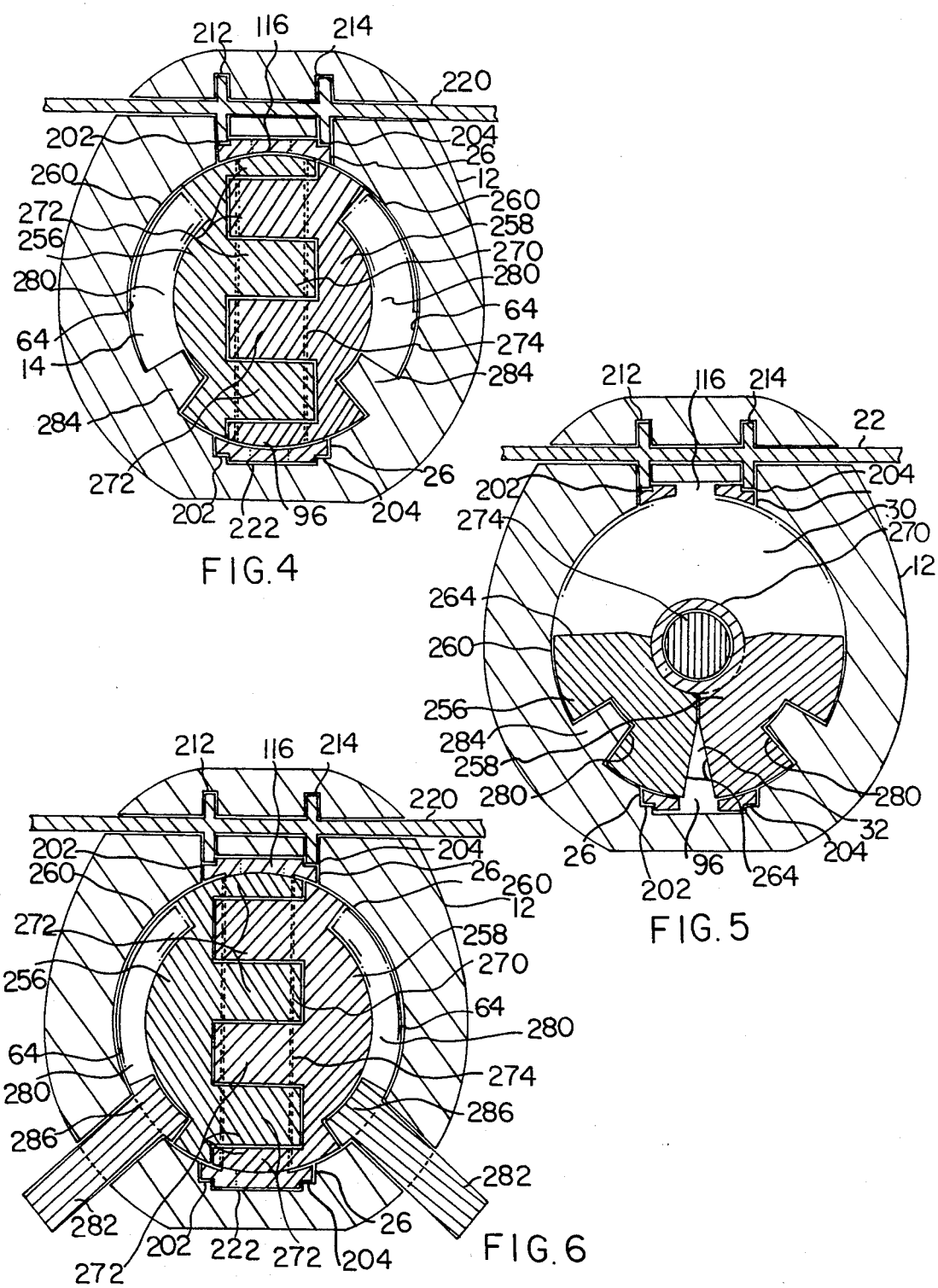

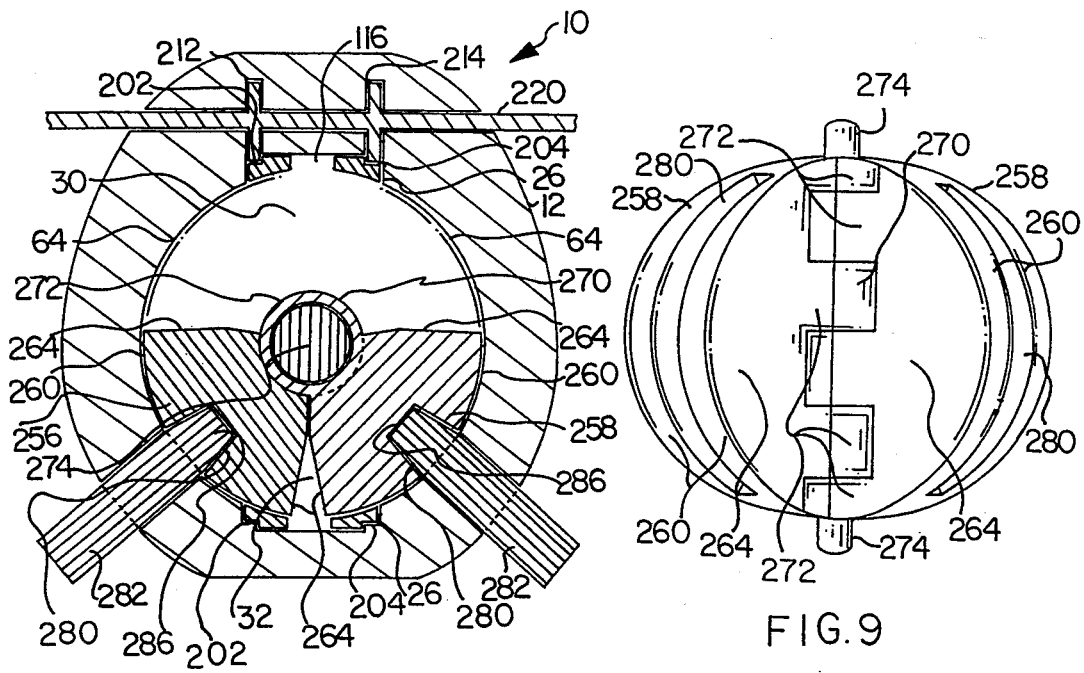
FIG.7
FIG.9
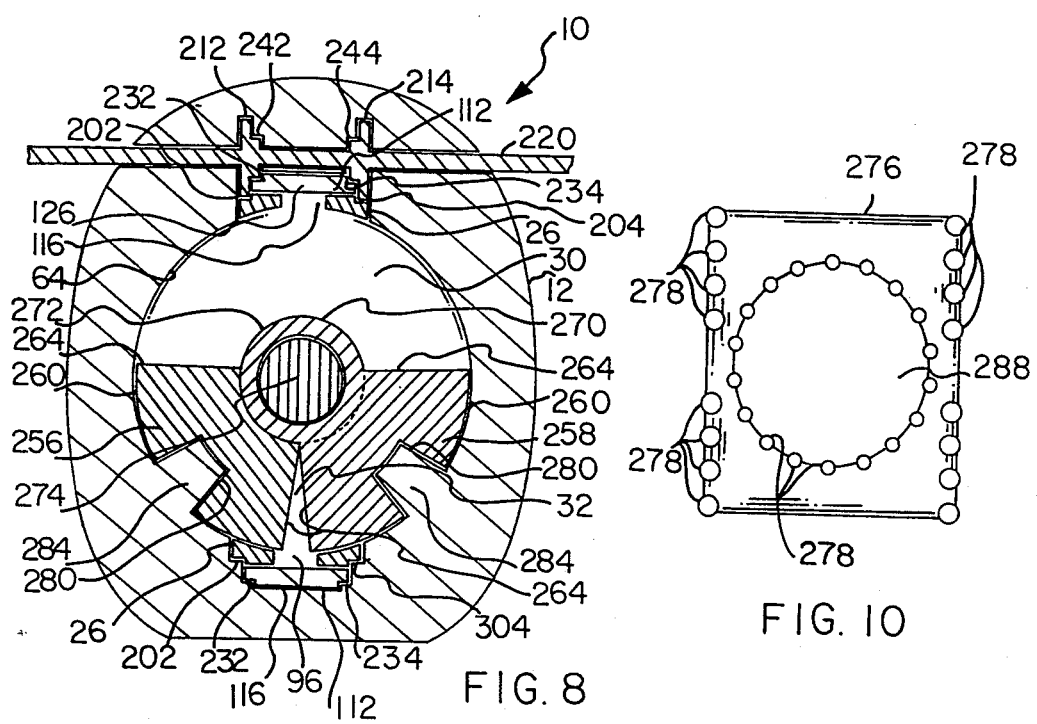
FIG.8
FIG.10

SPHERICAL ENGINE

This application is a continuation-in-part of patent application Ser. No. 07/804,971, filed on Dec. 11, 1991, now abandoned.

BACKGROUND OF THE INVENTION

Cross-Reference to Related Patents

The subject matter of this application is related to the subject matter of U.S. Pat. No. 4,519,756 issued on May 28, 1985, and U.S. Pat. No. 4,589,388, issued on May 20, 1986, both filed by the present applicant.

Field of the Invention

The present invention relates generally to the field of rotary engines, and more particularly to an engine with a compartment in the form of two hemispherical sections separated to create a gap, with a ring gear surrounding the gap, containing two wedge members mounted on a hinge pin extending into the ring gear, dividing the compartment into two combustion chambers, such that as the ring gear and wedges rotate relative to the hemispheres, these chambers expand and contract.

Background Information

There have long been rotary and spherical engines offered as alternatives to the conventional piston engine, offering benefits of compactness, simplicity and added power. Yet these engines have often been far from simple, have rattled due to chamber sealing problems and have had poor reliability records. Examples of prior rotary engines are presented below, and their disadvantages are identified.

Description of the Prior Art

Smith, U.S. Pat. No. 4,024,841, issued on May 24, 1977, teaches a rotary internal combustion engine. A spherical hub having radially projecting vanes is mounted on a drive shaft in a spherical housing. Fixed walls intersect the vanes, and define individual combustion chambers. A follower member projects from the hub into a sinusoidal groove in the housing, so that the hub and vanes oscillate laterally during rotation, expanding and contracting the chambers. This action permits the establishment of compression and combustion cycles. A problem with Smith is that it is complex and expensive. Another problem is that the hub occupies much of the space in the housing, wasting potential combustion volume and adding bulk to the device.

Lien, U.S. Pat. No. 4,721,079, issued on Jan. 26, 1988, discloses a rotary engine wherein a drive shaft and hub extend axially through an arched ring casing. Vanes project radially from the hub and define combustion chambers. Two disk-shaped rotors extend around the hub at angles such that they converge at one end of the casing and diverge at the other. The rotors have slots to receive and slide relative to the vanes. Fuel is sprayed into each chamber as the rotors converge, and the fuel is ignited, causing divergence and rotation. In this way, once the shaft and rotors are set in rotary motion to start the engine, the combustion perpetuates the rotation. A problem with this arrangement, once again, is that it is complex and expensive, unreliable, and wastes substantial casing space due to its bulky hub member.

Bajulaz, U.S. Pat. No. 4,021,158, issued on May 3, 1977, reveals two wedge-shaped sphere sections pivoting together from side to side within a spherical casing. Angled drive shafts enter the casing, and transmit power through a complex gear arrangement. The complexity of the gear arrangement required to deliver power and torque from Bajulaz makes it expensive and relatively unreliable.

May, et al, U.S. Pat. No. 3,184,154, issued on May 18, 1965, describes an air compressor operating on a principle similar to a spherical engine. The shaft of an electric motor is affixed to a wedge-shaped member rotatably fitted into a hemispherical chamber. A hemispherical member or web fits slidably within the chamber and has a wide wedge-shaped slot. The slot surrounds the wedge-shaped member. The web rotates on an axis at an angle with shaft so that the slot of the web swings back and forth around the wedge member. During this rotation, a space opens on one side of the wedge member and a similar space simultaneously closes on the other side of the wedge member. Air enters on the opening side and is forced out of a port on the closing side. A problem with May is that it utilizes only a small portion of the interior of the chamber, and thus lacks efficiency. Also, rather than rotating the lighter wedge member, May rotates the bulky and heavy web, which additionally diminishes efficiency.

Kempthorne, U.S. Pat. No. 2,043,544, issued on Jun. 9, 1936, teaches a rotary engine. An operating shaft passes through a spherical casing and through the diameter of an essentially disk-shaped member to which it is joined. The disk-shaped member has a cylindrical middle portion extending perpendicular to the axis of the drive shaft. A second disk member with converging faces extends through the interior of the casing at a acute angle with the shaft and into a slot around the inner wall of the casing. Four combustion chambers are formed between the faces of the two disk members. As the operating shaft rotates, the angled relation of the members causes the chambers to alternately expand and contract. The problems associated with Kempthorne are the same ones identified above for May.

Cohen, U.S. Pat. No. 2,069,646, issued on Feb. 2, 1937, discloses a rotary engine much like those described above. A driving plate, rotatable within a working sphere, is variably intersected by a rotatable drum to divide the sphere into four combustion chambers. This design is complex and cumbersome.

Other references include Kempthorne, U.S. Pat. No. 1,952,260, issued on Mar. 27, 1934; McMaster, U.S. Pat. No. 4,688,522, issued on Aug. 25, 1987; Kimov, U.S.S.R. Patent Number 909,309, issued on Feb. 28, 1982; Karacsony, German Democratic Republic Patent Number 145,206, issued on Nov. 26, 1980.

What is needed is a rotary engine which is simple in design, durable, reliable, has a single power delivery member, is smooth running, and makes maximum use of the space in the chamber.

SUMMARY OF THE INVENTION

In accordance with one aspect of this invention, there is provided an engine for improved power, efficiency and reliability, which includes an engine block containing a compartment in the form of a sphere with an equatorial zone removed to create an annular gap, at least one ring member slidably encircling the annular gap having an outer surface and having at least one opening to permit the passage of combustion gases which periodically aligns with a port in the engine block, a hinge pin mounted within the ring member and extending through the center point of the sphere, a first divider member having a connecting end and a free end, the connecting end of which includes at least one tube section which surrounds the hinge pin, and the free end of which is directed toward, abuts and conforms to the sphere surface, a second divider member having a connecting end and a free end, the connecting end of which includes at least one tube section which surrounds the hinge pin, and the free end of which is directed toward, abuts and conforms to the sphere surface, and which, together with the first divider member, separates the sphere into two combustion chambers having variable volumes, such that as one combustion chamber expands the other combustion chamber correspondingly contacts, a slot in the surface of the free end of each divider member extending parallel to the longitudinal axis of the hinge pin, a fulcrum member projecting from the sphere into each slot to guide the divider members, an ignition mechanism mounted in the sphere to ignite a fuel air mixture within the sphere alternately on either side of the dividing members.

The first and second dividing members are preferably each wedge-shaped members having a narrow end and a wide end, wherein the connecting end is the narrow end and the free end is the wide end. An optional second ring member slidably surrounds the first ring member, having an outer surface and having gear teeth on the outer surface and having at least one opening which periodically aligns with an opening in the first ring member and with a port in the sphere to permit the passage of combustion gases into and out of the sphere. Gear teeth are preferably provided on the outer surface of the ring member for transmitting engine power and torque. A drive shaft fitted with a gear engages the gear teeth on the outer surface of the ring member.

To permit two cycle operation, compressed air can be supplied to the sphere with an apparatus which includes an outer housing having a cylindrical cavity with ports leading from the cylindrical cavity to the exterior of the outer housing and to a chamber for holding compressed air, and having a top end and a bottom end, a top member for covering the top end and a bottom member for covering the bottom end of the cylindrical cavity, a tubular extension adjoined to and extending coaxially from the ring member, preferably having a top edge and gear teeth along its top edge for transmitting engine power and torque, a first circular wall adjoined to and extending upwardly from the bottom member inside the cylindrical cavity, concentric with the cylindrical cavity, slidably surrounding the ring member tubular extension, the first circular wall having ports which periodically align with the ring member openings during ring member rotation, an engine block support which includes a circular cylinder support member containing a compressed air chamber, connected to the bottom member and slidably contained within the ring member tubular extension into which a first end of the engine block is mounted, and a second engine block support connected to the top member and slidably contained within the ring member tubular extension into which a second end of the engine block is mounted, an elliptical tube member fit coaxially and slidably within the cylindrical cavity having a long axis of sufficient length for the elliptical tube member to snugly fit against the inner surface of the cylindrical cavity and a short axis of a length permitting the elliptical tube member to slidably surround the circular housing wall, for rotating and thereby pushing and compressing air surrounding the elliptical tube within the cylindrical cavity, a connecting member for connecting the elliptical tube member to the ring member tubular extension, valves in the first circular wall for regulating the flow of air through the ports in the first circular wall, which open and close with the rotation of the elliptical tube member, to permit compressed air to enter the sphere and spent combustion gases to exit the sphere, valves in the outer housing for regulating the flow of air through the ports in the outer housing, which open and close with the rotation of the elliptical tube member, to open to permit air to enter the cylindrical cavity outside the elliptical tube member and close to prevent air from escaping while being pushed and compressed by the elliptical tube member, and to open to permit compressed air to flow into the compressed air chamber. The valves in the first circular wall and in the outer housing are preferably flap valves having an edge which resiliently drags against the surface of the elliptical tube member as the elliptical tube member rotates.

The hinge pin preferably contains an essentially axial passageway having a passageway entrance port in fluid communication with an air source and at least one passageway exit port adjacent to the at least one tube section and where the at least one tube section has a tube section opening which periodically aligns during the engine cycle with the at least one passageway exit port through which air for combusion is delivered into the sphere from the air source, alternately on either side of the first and second divider members.

BRIEF DESCRIPTION OF THE DRAWINGS

Several preferred embodiments of the subject invention are hereinafter described, with specific reference being made to the following FIGURES, in which:

FIG. 4 is a cross-sectional side view of the improved engine, showing the wedges and tangential drive shaft in longitudinal cross-section. The cylindrical projections are illustrated.

FIG. 5 is a cross-sectional side view of the improved engine, showing the wedges and tangential drive shaft in lateral cross-section. Also shown are the optional angled sides of the wedges for defining the minimum chamber volume. The cylindrical projections are illustrated.

FIG. 6 is a cross-sectional side view of the improved engine, showing the wedges and tangential drive shaft in longitudinal cross-section. The optional guide rods are illustrated.

FIG. 7 is a cross-sectional side view of the improved engine, showing the wedges and tangential drive shaft in lateral cross-section. Also shown are the optional angled sides of the wedges for defining the minimum chamber volume. The optional guide rods are illustrated.

FIG. 8 is like FIG. 5 except that the double ring member option is illustrated.

FIG. 9 is a perspective view of only the wedges and hinge pin of the present, improved engine.

FIG. 10 is an end view of a cylindrical projection swiveling head, having roller bearings within its mounting bore and also along its outer faces which make contact with wedge member groove walls.

DETAILED DESCRIPTION OF THE INVENTION

Figure 1:
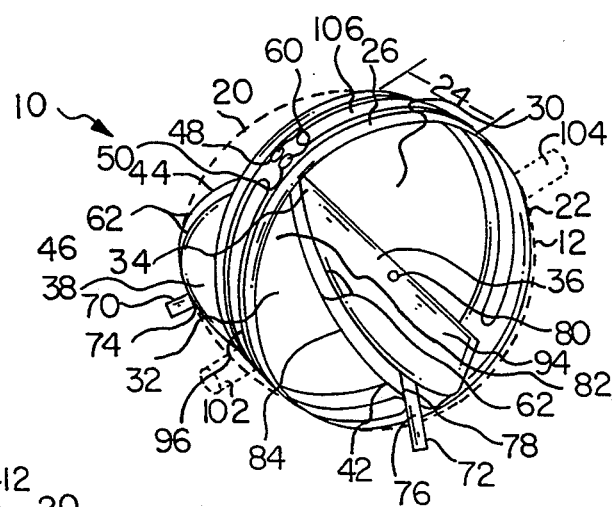
FIG. 1 is a perspective view of the prior engine, with the hemispherical sections shown in broken lines.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

The various FIGURES of the drawings illustrate an improved spherical engine which can function either as an internal or external combustion engine. This engine improves upon a general design set forth in applicant's prior patents, U.S. Pat. No. 4,519,756, issued on May 28, 1985 and U.S. Pat No. 4,589,388, issued on May 20, 1986. The prior design is summarized below so that the inventive improvements to it can be identified.

Prior Engine Design

Figure 2:
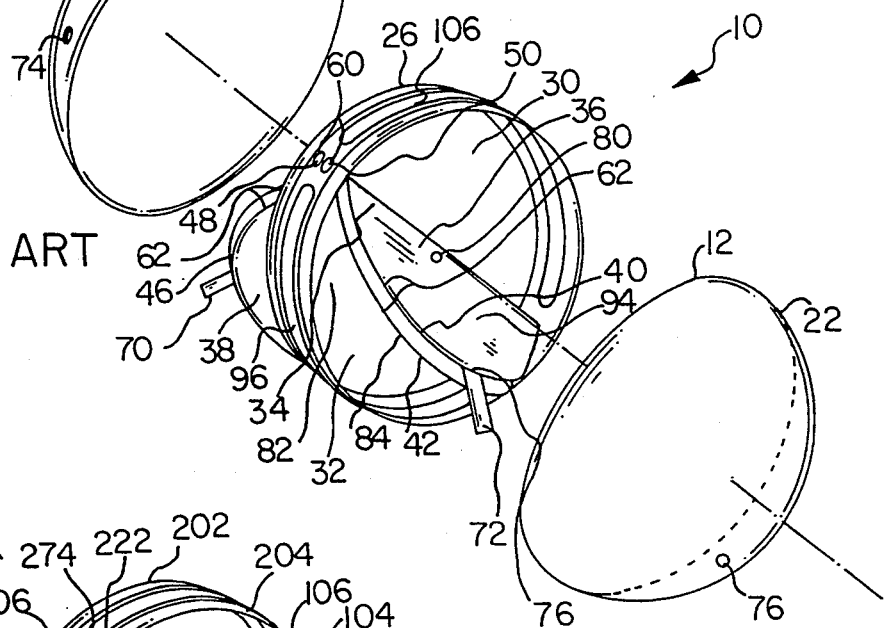
FIG. 2 is a partially exploded, perspective view of the prior engine, with the hemispherical sections extended away from the ring member and half disks.
Figure 3:
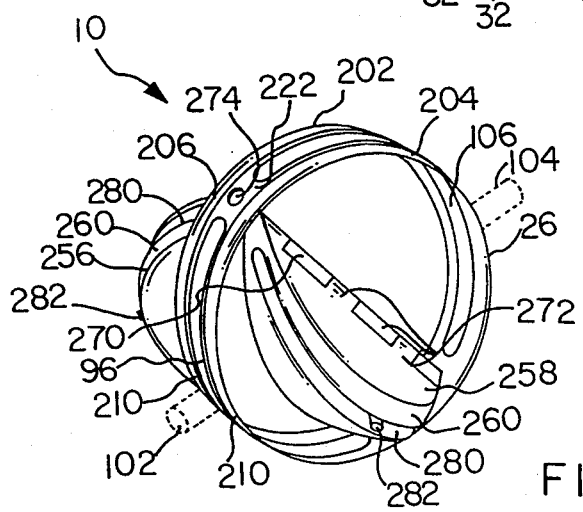
FIG. 3 is a perspective view of the present, improved engine, with the sphere sections removed.
Figure 13:
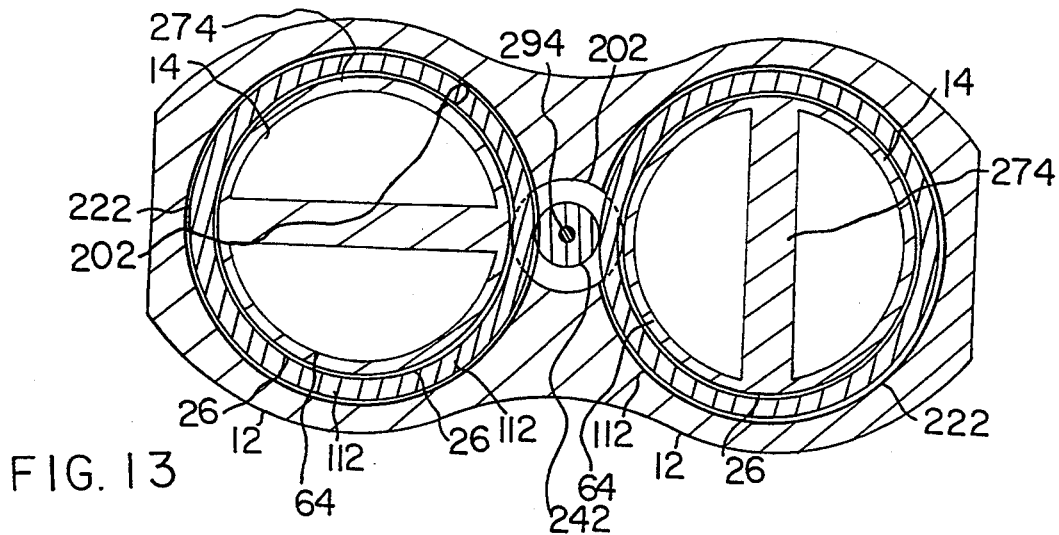
FIG. 13 is a cross-sectional side view of the double engine of FIG. 12. The two engines are ninety degrees out of phase. The wedges and their fulcrums are not shown.
Figure 12:
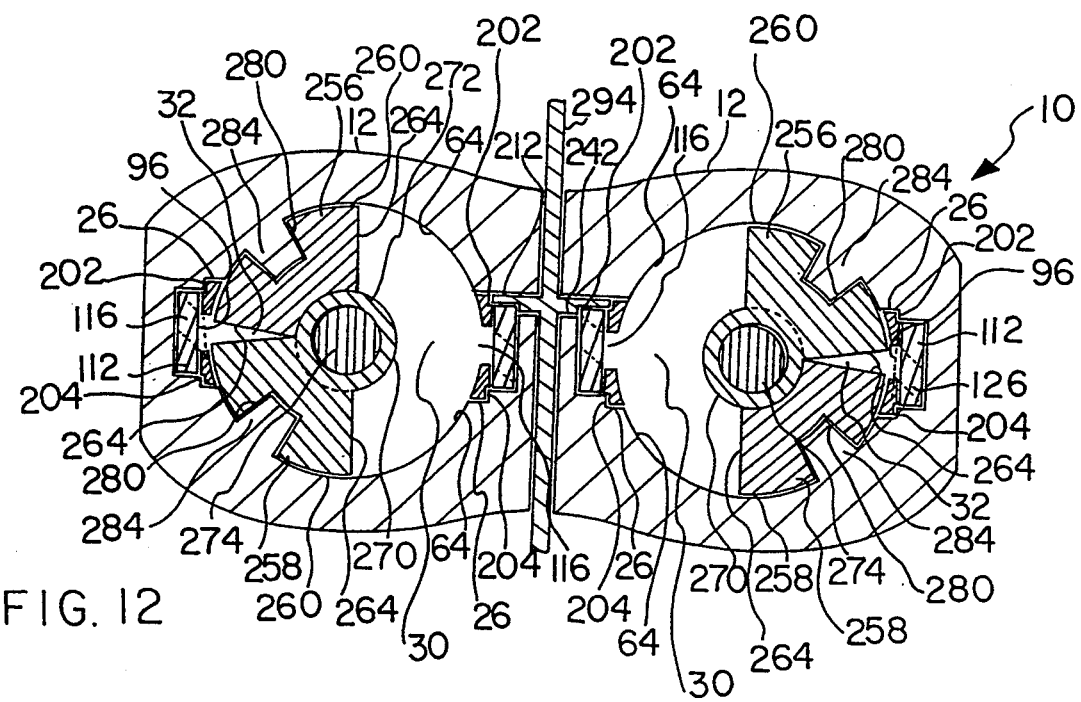
FIG. 12 is a cross-sectional top view of the double engine embodiment, showing the wedges and tangential drive shaft in lateral cross-section. The cylindrical projections are illustrated. The two engines are one hundred eighty degrees out of phase for smoother operation.

The prior design of engine 10 includes an engine block 12 with a spherical compartment, hereinafter referred to as sphere 14. Sphere 14 is split into two hemispheres 20 and 22, separated to form a gap 24. See FIGS. 1 and 2. At least one tubular ring member 26 slidably fits around and covers gap 24. The interior of sphere 14 is divided into a first chamber 30 and a second chamber 32 by a disk 34 which in turn is diametrically split into half disks 36 and 38. Half disks 36 and 38 are each formed of two closely spaced, parallel plates 40 and 42, and 44 and 46, which adjoin hinge pins 48 and 50, respectively. Hinge pins 48 and 50 extend into pin bores 60 in ring member 26. Hinge pins 48 and 50 abut each other and the curved edges 62 of disk halves 36 and 38 make sliding contact with the inner wall 64 of sphere 14, all in sealing relationship to separate chambers 30 and 32. Hinge pins 48 and 50 are free to pivot in pin bores 60 and also to rotate end over end with ring member 26 about an axis perpendicular to the longitudinal axes of hinge pins 48 and 50.

Two drive shafts 70 and 72 radially enter sphere 14 through openings 74 and 76 to either side of and equidistant from gap 24. Drive shaft 60 and drive shaft 62 each extend between parallel plates 40 and 44, and 44 and 46, of disk halves 36 and 38 respectively and each is pivotally attached thereto with a pivot pin 80. Each pivot pin 80 extends perpendicularly through plates 40 and 42 or plates 44 and 46, and the end of drive shaft 70 or 72 adjacent the middle of the hinge pin 48 or 50. Drive shafts 70 and 72 guide disk halves 36 and 38 during rotation, causing the point 78 on curved edge 62 of first disk half 36 adjacent drive shaft 70, at any given moment in time, to be separated from the corresponding adjacent point on second disk half 38 by the distance between drive shaft entry openings 74 and 76. When points 78 are the center points of curved edges 62, first faces 82 and 84 of disk halves 36 and 38 are positioned at a minimum distance from each other. At the same moment in time the second faces 92 and 94 of disk halves 36 and 38 are positioned at a maximum distance from each other. First chamber 30 is thus at its smallest volume when second chamber 32 is at its largest volume.

As disk halves 36 and 38 rotate with hinge pins 48 and 50 and ring member 26, the loci of edge points 78 adjacent drive shafts 70 and 72 approach hinge pins 48 and 50, thus spreading first faces 82 and 84 of disk halves 36 and 38 progressively farther apart. As hinge pins 48 and 50 pass between drive shaft openings 74 and 76, chambers 30 and 32 momentarily have equivalent volumes. Then first chamber 30 attains a progressively greater volume than second chamber 32. Second faces 92 and 94 of disk halves 36 and 38 approach each other until the minimum distance between them is reached as defined by the locations of drive shaft ports 74 and 76. Then, as ring member 26 rotates further, first faces 82 and 84 swing back toward each other to again reach the minimum distance as described above. In this way disk halves 36 and 38 pivot back and forth about hinge pins 48 and 50 in butterfly fashion as ring member 26 rotates, and chambers 30 and 32 alternately expand and contract. During this cycle, engine block 12 preferably remains stationary relative to ring member 26, disk halves 36 and 38, and drive shafts 70 and 72. Drive shafts 70 and 72 rotate at mutually equivalent speed.

Prior Engine Operation

The two variable volume chambers 30 and 32 function as engine 10 combustion chambers. As first chamber 30 expands, a fuel-air mixture or pressurized gas is sprayed into it through a slot 96 in ring member 26. First faces 82 and 84 of disk halves 36 and 38, concurrently with further rotation of drive shafts 70 and 72, close together to the minimum chamber volume, compressing the fuel-air mixture. Then the mixture is ignited, such as by a spark plug. The resulting expansion of gases drives first faces 82 and 84 of disk halves 36 and 38 apart. This can only happen concurrently with rotation of ring member 26 and drive shafts 70 and 72, the latter delivering power and torque. Once maximum chamber expansion has occurred in first chamber 30, it is opened to the atmosphere to exhaust the spent mixture. Fresh air enters, is charged with fuel and ignited again, repeating the cycle.

At the same time, an identical cycle is taking place in second chamber 32. The contraction of first chamber 30 causes second chamber 32 to expand. During this expansion, a fuel-air mixture or pressurized gas is sprayed into second chamber 32. The expansion of first chamber 30 from ignition of the mixture with it creates a contraction of second chamber 32, compressing its mixture for ignition. This double cycle gives two power strokes for each rotation of drive shafts 70 and 72.

Intake and exhaust ports 102 and 104 are fixed within engine block 12, each terminating adjacent the at least one ring member 26. Fuel is sprayed from intake port 102 through a circumferential slot 96 in ring member 26 as ring member 26 rotates. The length of slot 96 determines the duration of the spraying. A separate circumferential slot 106 in ring member 26 permits exhaust gases to escape through exhaust port 104. A second ring member 112 may be provided in close sliding contact around first ring member 26. Second ring member 112 is also provided with circumferential slots 116 and 126 for intake and exhaust. Slots 96 and 116, 106 and 126, respectively, must be mutually aligned for intake of fuel or exhaust of spent gases to occur. Ring members 26 and 112 either rotate in opposite directions or at different relative speeds so that slots 96 and 116, and 106 and 126 align and then non-align as needed for engine 10 operation.

Engine 10 is highly efficient, light, occupies minimal space, and delivers many-fold the power and torque of a comparably sized piston engine. Despite these substantial advantages, greater ease in power transmission could be achieved if power were delivered through a single drive shaft. A special transmission is needed to combine their torque and power of diverging drive shafts 70 and 72. Longer engine 10 life could be achieved if durable substitutes for disk halves 36 and 38 were developed. More reliable sealing could be achieved if the disk halves 36 and 38 or equivalent members integrally joined rather than abutted each other. With these improvements achieved, the benefits of this truly revolutionary engine could be fully realized.

Inventive Improvements to Engine

The improvements to engine 10 set forth below attain these important advantages. The first improvement is achieved by cutting both edges 202 and 204 of the outer surface 206 of ring member 26 into gear teeth 210 so that ring member 26 becomes a ring gear. See FIGS. 3 through 7. Teeth 210 on edges 202 and 204 engage separate transmission gears 212 and 214, mounted on a drive shaft 220 tangential to sphere 14. The middle band 222 of outer surface 206, bordered by gear teeth 210, is perforated by circumferential slots 96 and 106 of prior engine 10 to receive fuel and exhaust spent gases. As in prior engine 10, a second ring member 112 may slidably fit around first ring member 26 and also have circumferential slots 116 and 126. See FIG. 8. The slots of the first and second ring members must, as before, be mutually aligned for gases to enter or escape sphere 14. Intake slot 116 of second ring member 112 is preferably angled toward edge 202 while exhaust slot 126 is preferably angled toward edge 204 of ring member 112. This angling is desirable because second ring member 112 must be narrower than first ring member 26 so that it fits between transmission gears 212 and 214. The angling of slots 116 and 126 eliminates the need to laterally offset one slot relative to the other to achieve exclusive fluid communication with either intake port 102 or exhaust port 104. See FIG. 8. Ports 102 and 104 are mutually offset, and the angling of slots 116 and 126 offsets only their outer entrances to align each with ports 102 and 104, respectively.

Like first ring member 26, second ring member 112 may be provided with teeth 210 along its outer surface 232 edges 234 and 236 to engage smaller diameter gears 242 and 244 on drive shaft 220. See FIG. 8. This causes ring members 26 and 112 to rotate at different speeds so that their slots 96 and 116, and 106 and 126 only overlap at certain predetermined locations. Ring member 112 preferably rotates at half the speed of ring member 26. Tangential drive shaft 220 extends out of at least one side of engine block 12 and transmits power and torque from inventive engine 10. See FIGS. 2 through 8.

Double plate disk halves 36 and 38 are preferably replaced with slotted wedges 256 and 258 having essentially triangular lateral cross-sections. See FIG. 9. Wedges 256 and 258 each have a double curved face 260 which fits against and conforms to sphere wall 64, and the converging sides 264 of each wedge radially extend generally toward a diametrical line through sphere 14. The peak at the intersection of converging sides 264 expands to form a tube portion 270, the axis of which extends through the center point of sphere 14. A middle segment of tube portion 270 on wedge 256 is cut away, and the end segments of tube portion 270 on wedge 258 are also cut away, so that the remaining tube segments 272 of each fit together. This fit permits axial alignment of tube segments 272 so that a hinge pin 274 can be fit through tube segments 272, joining wedges 256 and 258 in a pivotal, hinged relationship. Hinge pin 274 can be integral with tube portion 270, since hinge pin 274 need not be capable of rotating relative to tube portion 270. Since there is only a single hinge pin 274 rather than the two parallel hinge pins of the prior engine, wedge members 256 and 258 pivot about an axis through the center point of sphere 14. For this reason gap 24 is created by cutting an equatorial zone out of sphere 14 rather than by splitting sphere 14 into hemispheres 20 and 22 and separating them.

A groove 280 parallel to the axis of hinge pin 274 is cut into each wedge 256 and 258 on double-curved face 260 to receive a guide rod 282 or cylindrical projection 284, described below. The walls of each groove 280 are preferably beveled to a groove bottom which is narrower than the groove entrance and matches the contour of the guide rod 282 head or cylindrical projection 284. Each groove 280 has two ends, each end at a distance from hinge pin 274 equal to the distance between hinge pin 274 from guide rod head 286 or cylindrical projection head 276. The resulting joint is highly durable and will survive the rigors of combustion over a long life.

The angle between converging sides 264 of each wedge 256 and 258 and the location of guide rods 282 or projections 284 may be selected so that sides 264 of adjacent wedges 256 and 258 do not completely close together during butterfly rotation. This minimum distance between sides 264 defines the minimum volume of chambers 30 and 32. See FIG. 8. Alternatively, sides 264 may be angled at their radial mid-point so that when wedges 256 and 258 are brought into mutual contact, a space between the angled side portions remains. See FIG. 5 and 7. This space can serve as the minimum chamber volume.

Figure 11:
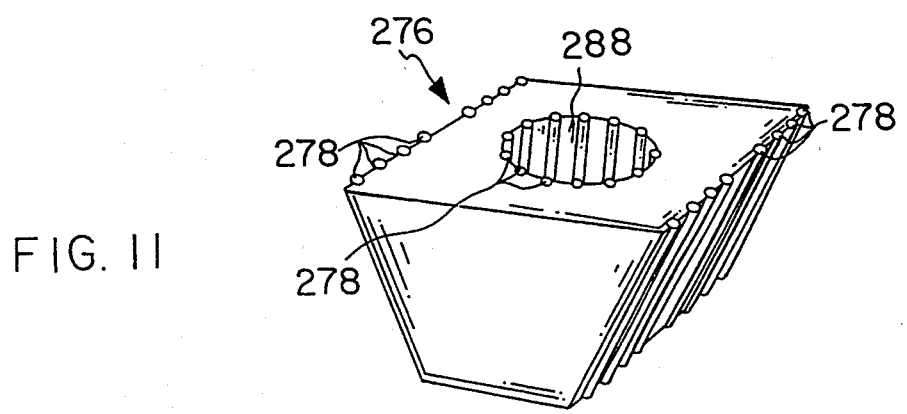
FIG. 11 is a perspective view of the swiveling head of FIG. 10.
Figure 14:
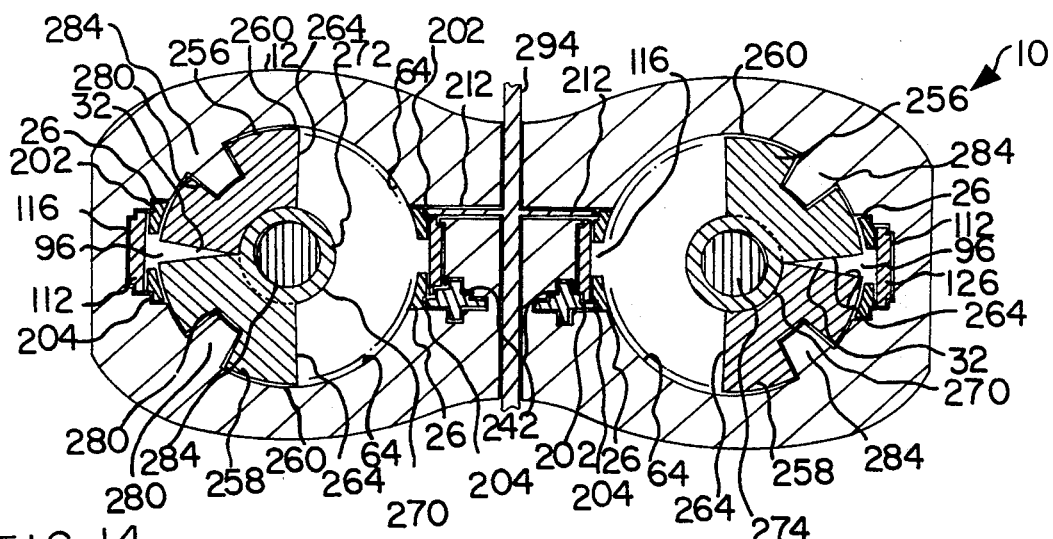
FIG. 14 is a cross-sectional top view of another version of the double engine embodiment wherein the small transmission gears engaging the second ring member are mounted on the opposite side of the ring members from the transmission gear engaging the first ring member. The two engines are one hundred eighty degrees out of phase for smoother operation.
Figure 15:
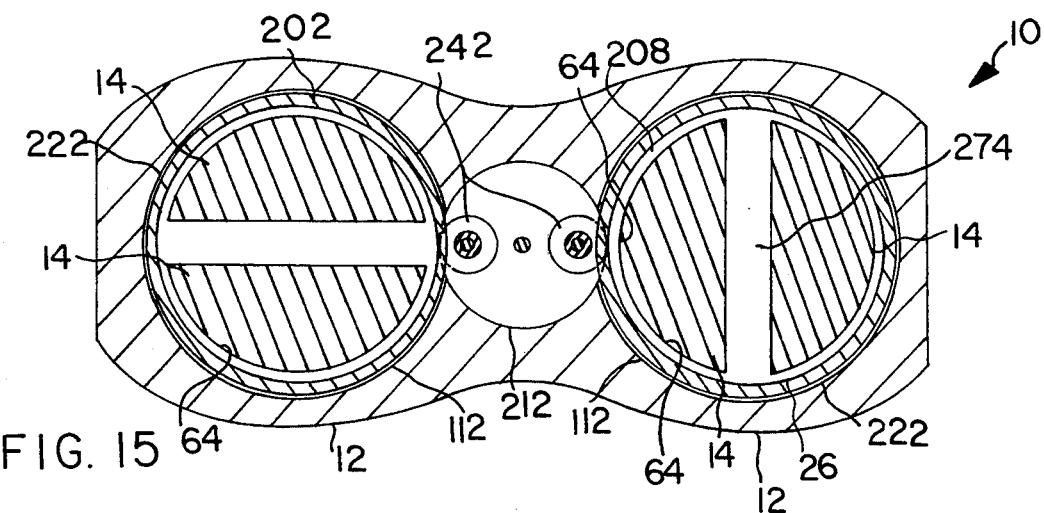
FIG. 15 is a cross-sectional side view of the double engine of FIG. 14. The two engines are ninety degrees out of phase. The wedges and their fulrums are not shown.

With the additions of gear teeth 210 on the at least one ring member 26 and tangential drive shaft 220, radial drive shafts 70 and 72 of prior engine 10 can be eliminated. In their place there are provided cylindrical projections 284 extending from sphere wall 64 at the same locations where drive shafts 70 and 72 entered. See FIGS. 4 and 5. Projections 284 guide the movement of wedges 256 and 258 and create the butterfly effect created by drive shafts 70 and 72 in prior engine 10, but projections 284 are of wider diameter and thus are more durable. Projections 284 are beveled to match the inner contour of slots 280, as mentioned above. Alternatively, a wedge shaped swivel head 276 conforming to the shape of grooves 280 and having a projection receiving bore 288 may be rotatably fit over each projection 284. Roller bearings 278 line bore 288 and also surround the exterior surfaces of head 276 adjacent the walls of grooves 280. See FIGS. 10 and 11.

Still another alternative is for guide rods 282 to radially enter sphere 14 at the same locations drive shafts 70 and 72 did. See FIGS. 6 and 7. Guide rods 282 preferably have beveled, rectangular heads 286, which fit into grooves 280 in wedges 256 and 258. As wedges 256 and 258 rotate through their butterfly motion, grooves 280 change orientation with respect to guide rods 282. For this reason swivel heads 276 and the alternative guide rods 282 are rotatably mounted so that their heads 286 can pivot in accommodation. An advantage of swivel heads 276 and of guide rod 282 heads 286 is that they make broad surface contact with grooves 280 while cylindrical projections 284 make only line contact. Where roller bearings 278 are employed, the load is distributed over a plurality of line contacts.

Figure 16:
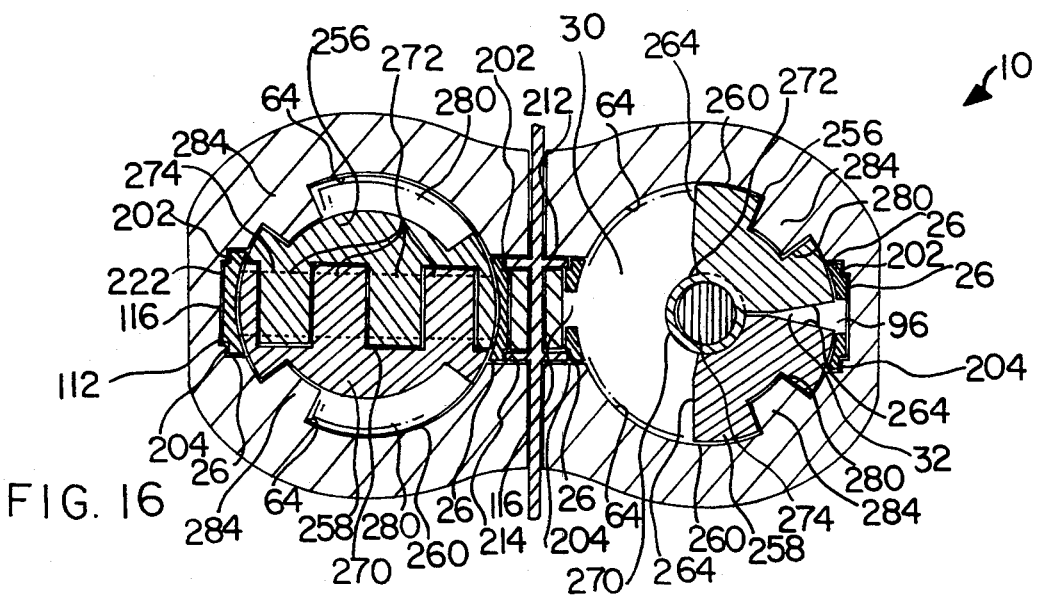
FIG. 16 is a cross-sectional top view of a double sphere positive displacement engine employing the inventive improvements of the ring member transmission gearing and the wedge members mounted on a single hinge pin. The two sides are ninety degrees out of phase for smoother operation.
Figure 18:
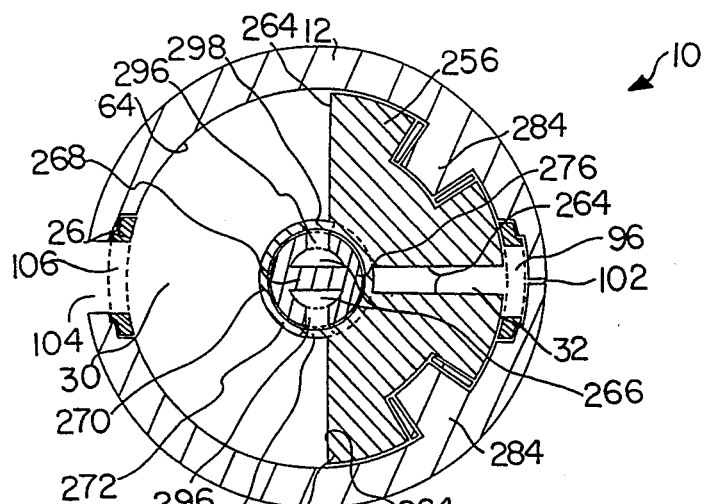
FIG. 18 is a cross-sectional side view of the improved engine with the hollow air delivering hinge pin feature, showing the hinge pin, hinge pin air passageway and wedges in lateral cross-section. Also shown are the intake and exhaust ports in the housing and ring members.
Figure 19:
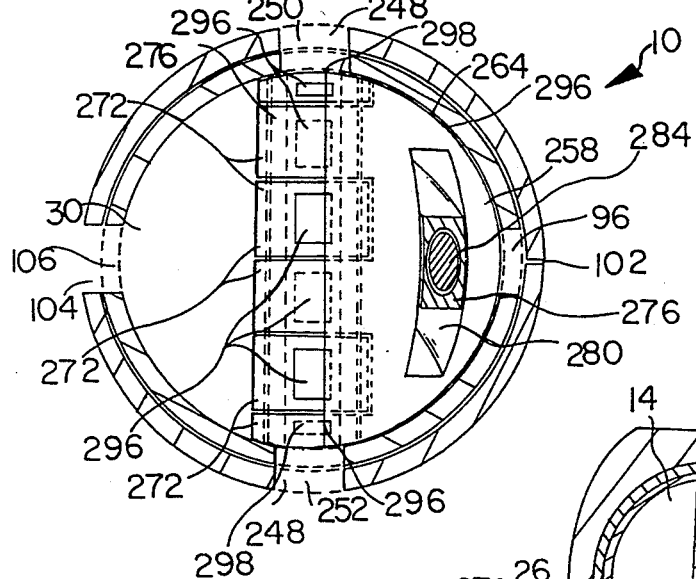
FIG. 19 is a cross-sectional side view of the improved engine with the hollow air delivering hinge pin feature, showing the three wedge ports for one wedge aligned with passageway exit ports on the near side of the hinge pin, and showing the aligned wedge ports for the other wedge and passageway exit ports on the hidden far side of the hinge pin in broken lines.
Figure 17:
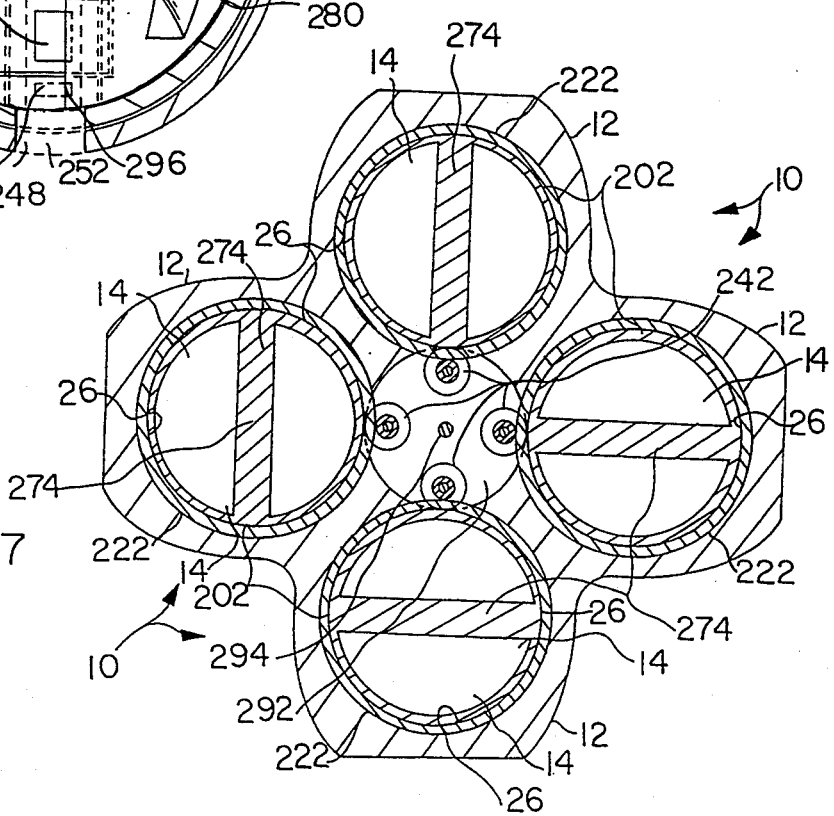
FIG. 17 is a cross-sectional side view of the cluster engine arrangement, where multiple engines are positioned around a sun gear connected to a main drive shaft. The wedges and their fulcrums are not shown.
Figure 20:
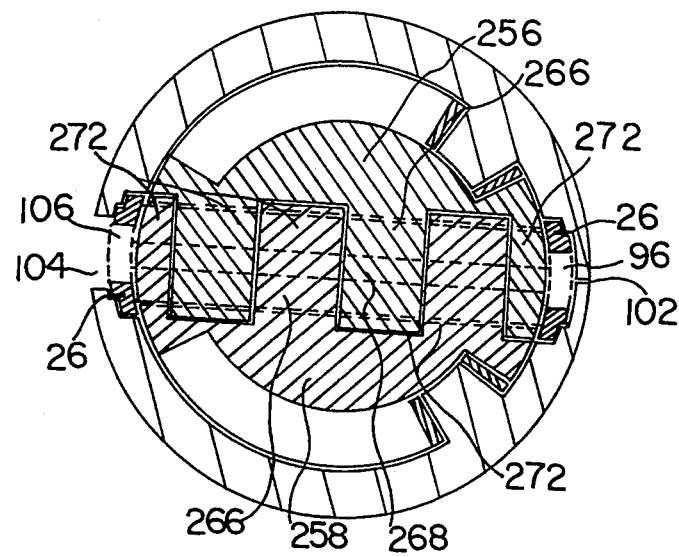
FIG. 20 is a cross-sectional side view of the improved engine of FIG. 18, but 90 degrees advanced through the engine cycle. The hidden air passageway is shown in broken lines.
Figure 21:
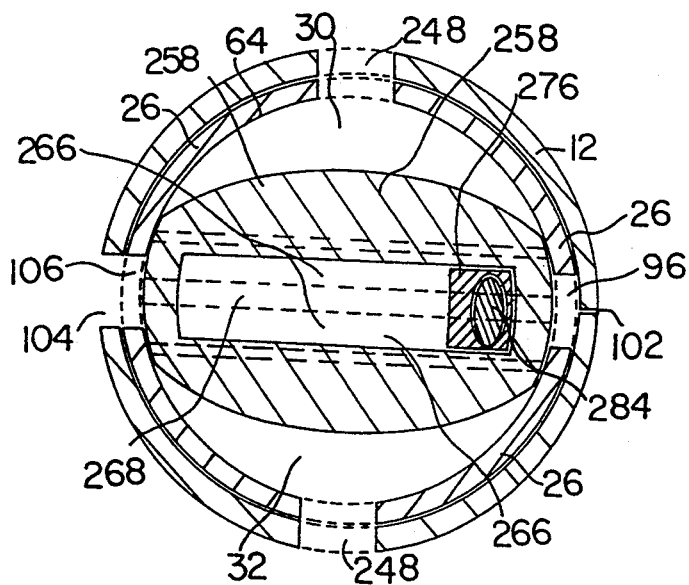
FIG. 21 is like FIG. 20 but shown from a cross-sectional perspective at a right angle to FIG. 20.
Figure 22:
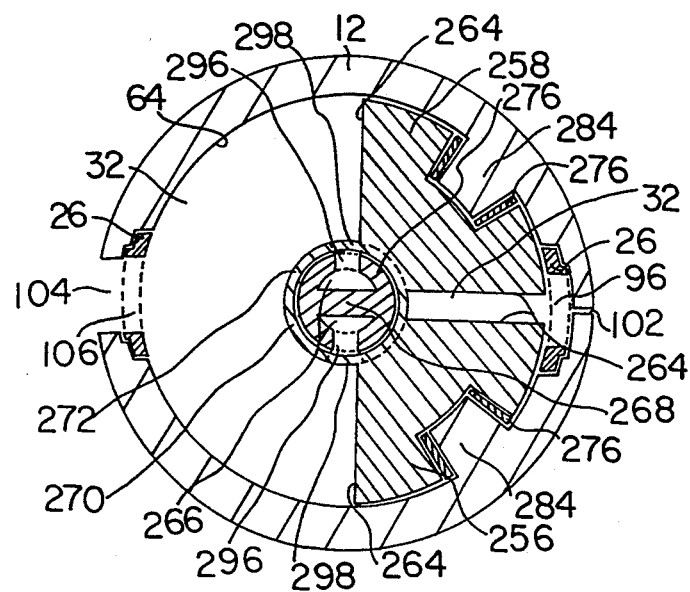
FIG. 22 is a cross-sectional side view of the improved engine as shown in FIG. 18, but 180 degrees advanced through the engine cycle.
Figure 25:
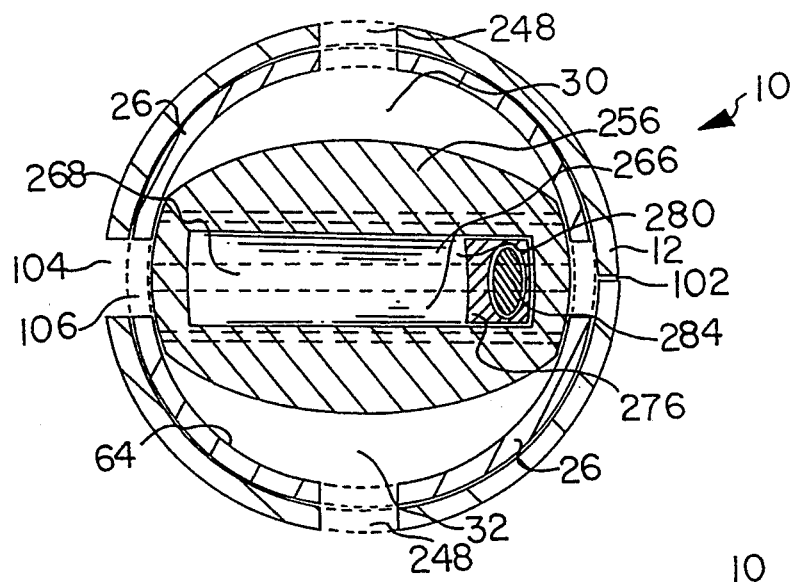
FIG. 25 is a cross-sectional side view of the improved engine as shown in FIG. 21, but 270 degrees advanced through the engine cycle.
Figure 24:
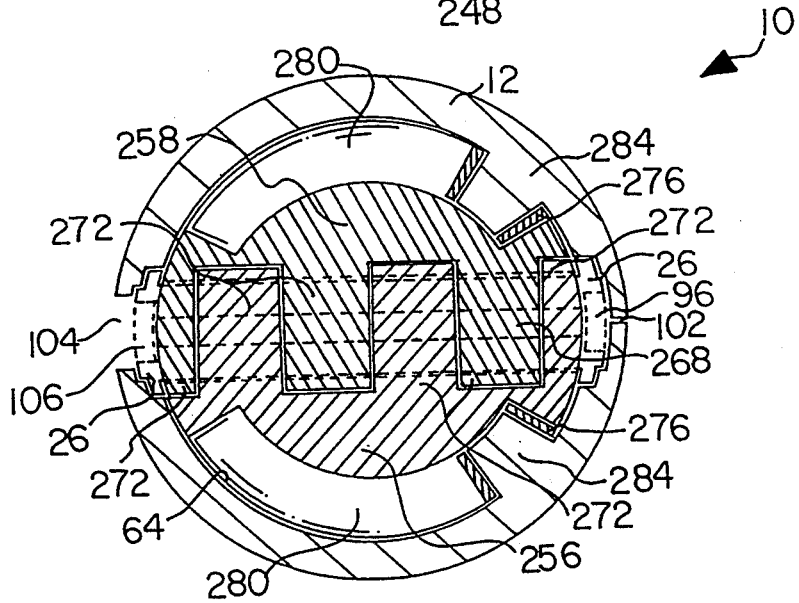
FIG. 24 is a cross-sectional side view of the improved engine as shown in FIG. 20, but 270 degrees advanced through the engine cycle.
Figure 23:
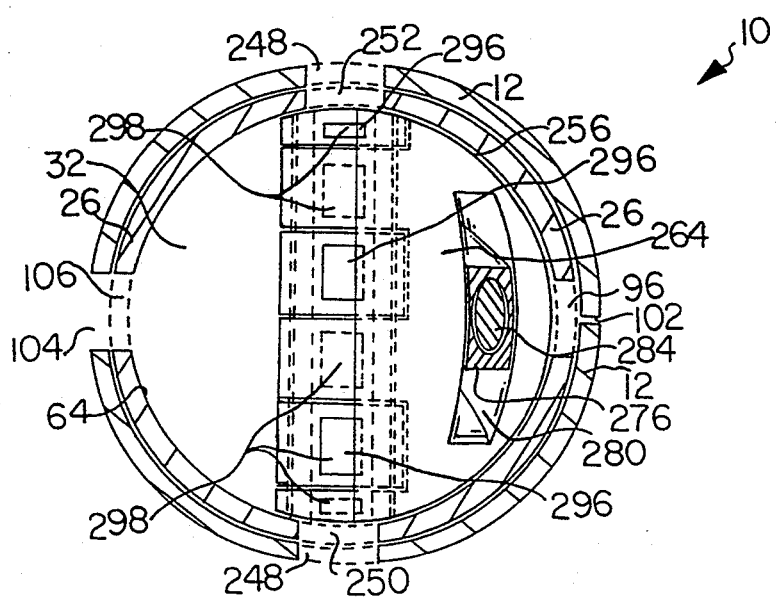
FIG. 23 is a cross-sectional side view of the improved engine as shown in FIG. 19, but 180 degrees advanced through the engine cycle.
Figure 26:
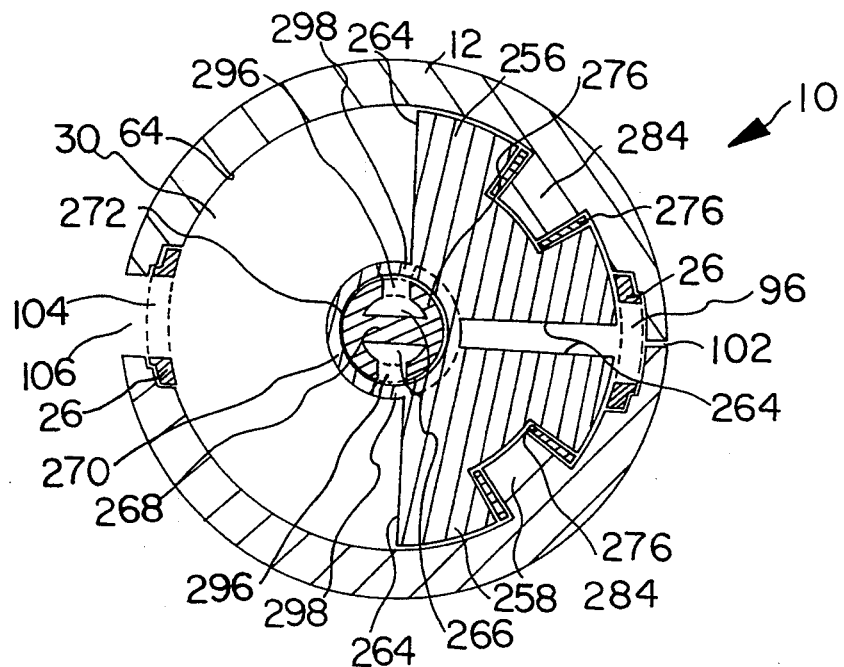
FIG. 26 is a cross-sectional side view of the improved engine of FIG. 18, returned to the same position as shown in FIG. 18 after advancing through the full 360 degrees of the engine cycle.
Figure 27:
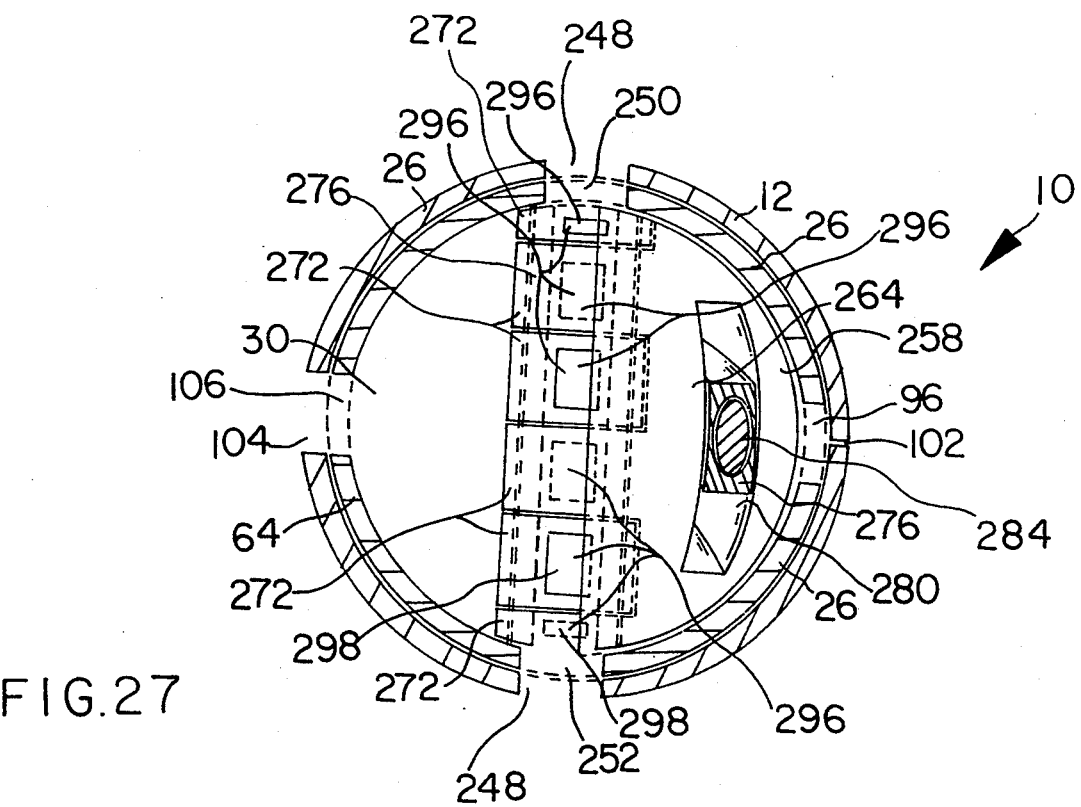
FIG. 27 is a cross-sectional side view of the improved engine of FIG. 19, returned to the same position as shown in FIG. 19 after advancing through the full 360 degrees of the engine cycle.

Two engines 10 can drive a single gear 212 for added power. See FIGS. 12-15. These engines 10 are preferably one hundred eighty degrees out of phase with each other to minimize vibration. FIG. 16 shows the alternative of a double-engine. A plurality of engines 10 may be placed around a sun gear 292 in a planet arrangement so that the gear teeth 210 of each mesh with sun gear 292. See FIG. 17. Sun gear 292 is connected to a main drive shaft 294. Several engines 10 in this cluster arrangement may occupy no more space than a single piston engine.

Improved engine 10 can operate as an internal combustion engine in the manner taught in applicant's prior patents. Intake and exhaust ports are provided as in the prior designs, as well as spark plugs or other ignition means. Improved engine 10 can also be used as an external combustion engine. Intake and exhaust ports are again provided as in the prior designs. For maximum efficiency, it is preferred that the pressure of gases expanding in chambers 30 and 32 be essentially equivalent to atmospheric when expansion is complete.

A preferred alternative to delivering air through slot 96 in ring member 26 is to deliver it through a hollow wedge hinge pin 276. Fuel is still injected through slot 96 and housing intake port 102, and intake port 102 is always at the minimum chamber 30 or 32 volume side of housing 12 and the exhaust port is always at the maximum chamber volume side of housing 12. Exhaust gases are still expelled through ring member slot 106 and housing exhaust port 104.

Hinge pin 276 is preferably wider than hinge pin 274, so that hinge pin 276 has both sufficient structure to have the same strength and durability as hinge pin 274 and an axially oriented air passageway 266. See FIGS. 18 through 27. Passageway 266 contains a diametrical structural support wall 268 to enhance hinge pin 276 strength. Compressed air is delivered into either or both ends of passageway 266 at passageway entrance openings 250 and 252 from a compressed air reservoir (not shown). Air enters entrance openings 250 and 252 through housing ports 248. Each passageway entrance openings 250 and 252 includes a check valve 254 to permit air to enter but not exit passageway 266 through entrance openings 250 and 252. Passageway exit ports 296 are provided on one side of pin 276 adjacent the center of each tube portion segment 272 for wedge 256 and on the opposite side adjacent the center of each tube portion segment 272 for wedge 258.

Figures 28, 28A, 28B:
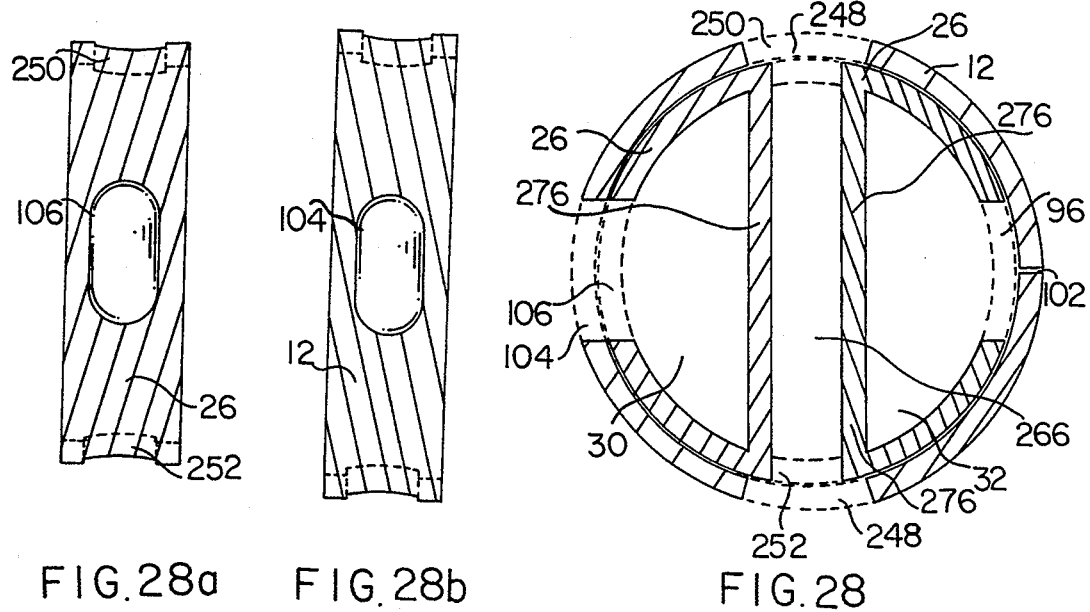
FIG. 28 is a cross-sectional view of the engine showing only the housing, rotating sleeve and hollow wedge hinge pin.
FIGS. 28a and 28b show cross-sections of the rotating sleeve and housing, respectively, revealing the shape and position of the exhaust slot and housing port.

Tube portion segments 272 are essentially as described above except that they also include wedge ports 298 which are located and sized to correspond and align with passageway exit ports 296. Passageway exit ports 296 and wedge ports 298 in wedges 256 and 258 align at the same point in the engine cycle described above when air is to be delivered into a first chamber 30 on one side of wedges 256 and 258. Then ports 296 and 298 move out of alignment and thus stop air flow into first chamber 30 so that compression, ignition and exhaust can take place. Fuel is simultaneously ingected into chamber 30 through slot 96. Then passageway exit ports 296 and wedge 298 ports of wedges 256 and 258 align to deliver air into second chamber 32 while on the other side of wedges 256 and 258 first chamber 30 is contracting with the convergence of wedges 256 and 258. Then ports 296 and 298 move out of alignment as well so that compression, ignition and exhaust can take place in second chamber 32. This complete engine cycle of is illustrated in FIGS. 18 through 27, where wedges 256 and 258, and ports 296 and 298 are shown in positions corresponding to sequential clockwise cycle stages 90 degrees apart. Tube portion 270 and thus segments 272 are of greater diameter for hinge pin 276 than for hinge pin 274, to accommodate the larger pin diameter. See FIG. 28.

Modification for Two Cycle Operation

Engine 10 above can function not only as a four cycle engine, but also as a two cycle engine. To function as a four cycle engine, at stated above, engine 10 draws in a charge of air, compresses the air and injects fuel, ignites the mixture, and expels the exhaust gases. Air is drawn into the engine by expanding the volume of the combustion chamber, and exhaust is later pumped out by decreasing the volume, both changes in volume being caused by the butterfly movement of wedges 256 and 258. Engine 10 can be modified to operate as a two-cycle engine by combining the intake and exhaust steps of the above cycle. This is accomplished by blowing fresh air from a compressed air source alternately into each combustion chamber to drive out the exhaust in that chamber in a single step.

Two essential modifications are required to make possible the two cycle mode of operation. First, a continuing source of compressed fresh air must be provided. The preferred way of doing this is to add the below-described sleeve extension structure to the apparatus. This structure takes advantage of the changing radius presented by the exterior of an elliptical cylinder rotating within a circular cylinder, to gather and compress air. Second, the intake and exhaust ports on the sleeve must be reconfigured and positioned.

The preferred sleeve extension structure is in part developed by extending the width of above-described ring member 26 to approximately twice the inner diameter of sphere 14. See FIGS. 29 and 30. In doing so, ring member 26 becomes more recognizable as a circular cylinder 300. A lip 304 is provided at one end of cylinder 300 which extends radially out from the axis of cylinder 300 so that its outer edge defines an ellipse. An elliptical wall 310 extends perpendicularly from the outer edge of lip 304 around and parallel to cylinder 300 to a length equal to that of cylinder 300. Wall 310 fits concentrically into a cylindrical housing 312 such that there is a close tolerance creating a seal between the exterior of elliptical wall 310 and the interior of housing 312. Housing 312 has a circular bottom plate 316 and a circular top plate 318 against which the long diameter ends 320 of elliptical wall 310 and cylinder 300 slide.

A first cylindrical housing wall 322 rises from bottom plate 316 to closely and sealingly surround cylinder 300. A second cylindrical housing wall 326 rises from bottom plate 316 and fits closely and slidingly within cylinder 300. Engine block 12 is mounted within second cylindrical housing wall 326.

Outer flap valves 324 are provided on opposing sides of the interior of housing 312 and bear against the exterior of elliptical wall 310. Outer flap valves 324 rise and fall with the changing radius presented by the rotation of wall 310 and make sealing contact therewith. Underneath each outer flap valve 324 is a port 330 leading to a compressed air reservoir. When a long diameter end 320 of elliptical wall 310 is aligned with outer flap valves 324, wall 310 pushes outer flap valves 324 flat into a recess 338 in the interior of housing 312 surrounding ports 330 and thus closes ports 330. Then as the long diameter end 320 rotates beyond outer flap valves 324 with the rotation of cylinder 300, a torsion spring 332 biases outer flap valves 324 to continue to bear against cylinder 300 and thereby gradually open as a progressively shorter diameter is presented. The long diameter ends 320 of elliptical wall 310 drag along the interior of housing 312 pushing air before them. As outer flap valves 324 swing open, this air is forced through ports 330. Air intake passages 336 are provided in housing 312 just beyond outer flap valves 324 to permit air to reenter the spaces between elliptical wall 310 and housing 312 to begin the cycle again.

Figure 30:
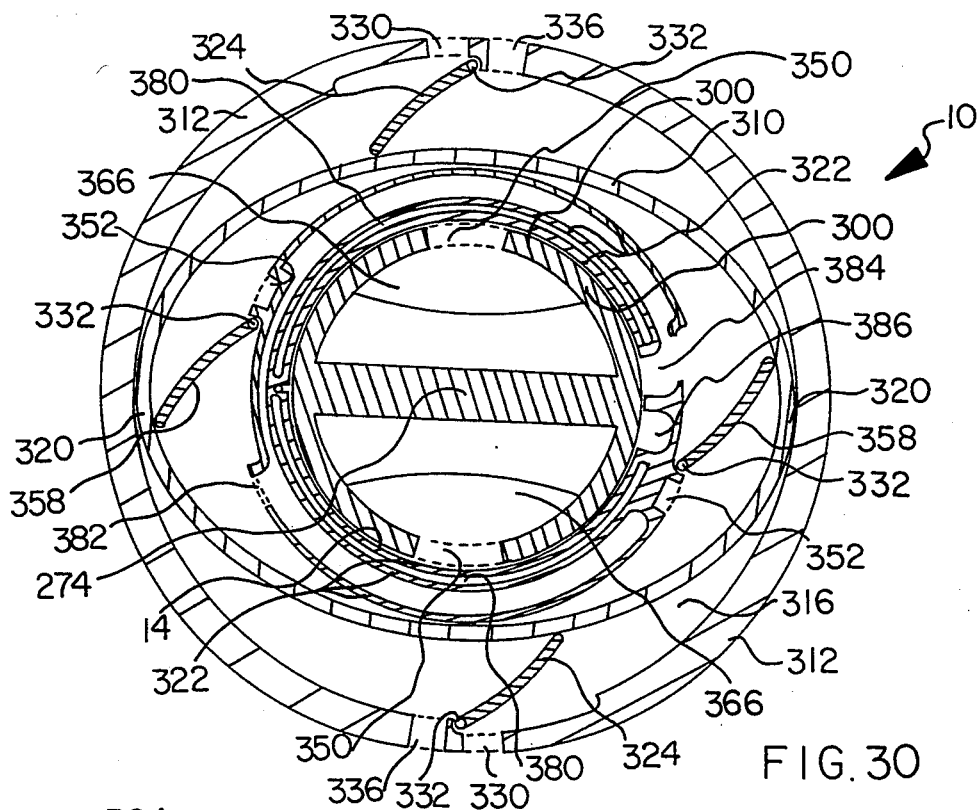
FIG. 30 is a cross-sectional top view of the two cycle engine and surrounding air compressing apparatus, as in FIG. 29, but with the positions of the elliptical wall and flap valves at ninety degrees rotation.

It is noted that circular cylinder 300, elliptical wall 310, first cylindrical housing wall 322 and outer flap valves 324, all extend from circular bottom plate 316 to circular top plate 318 and make sealing contact with plates 316 and 318. Inner flap valves 358 extend from plate 316 to lip 304 and makes sealing contact therewith. With the exception of flap valves 324 and 358, the relative lengths of these parts are shown in FIG. 30. Sealing contact may be achieved with sealing members attached along sealed edges.

Figure 29:
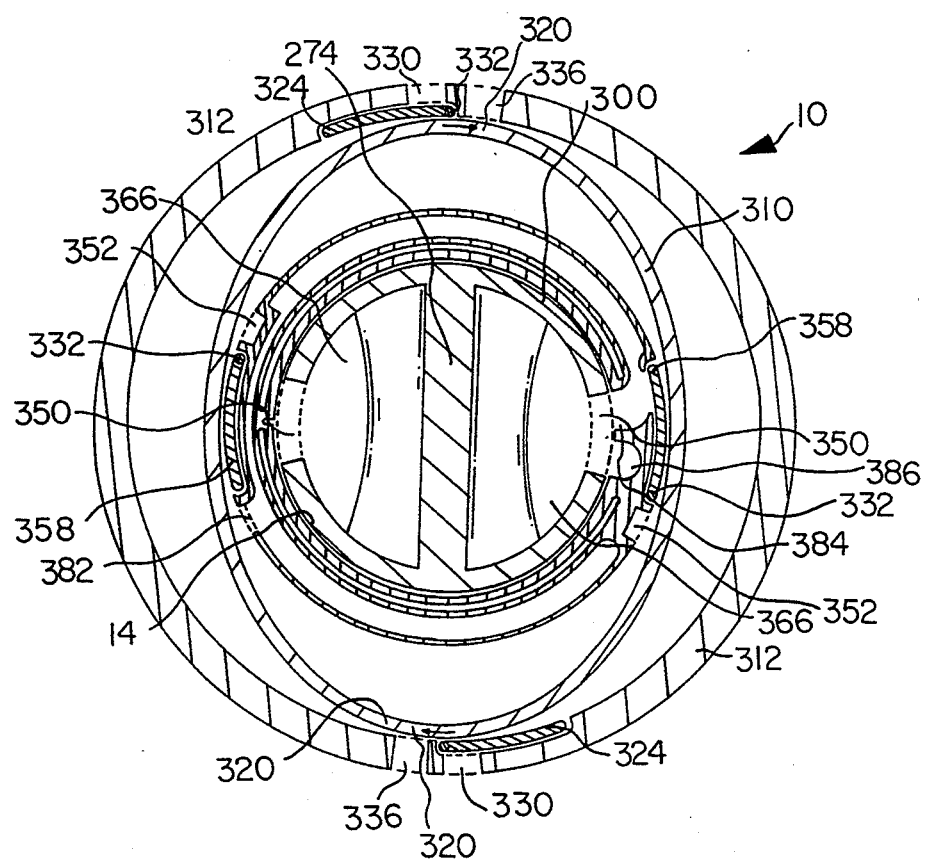
FIG. 29 is a cross-sectional top view of the two cycle engine and surrounding air compressing apparatus. The wedges are not shown.
Figure 31:
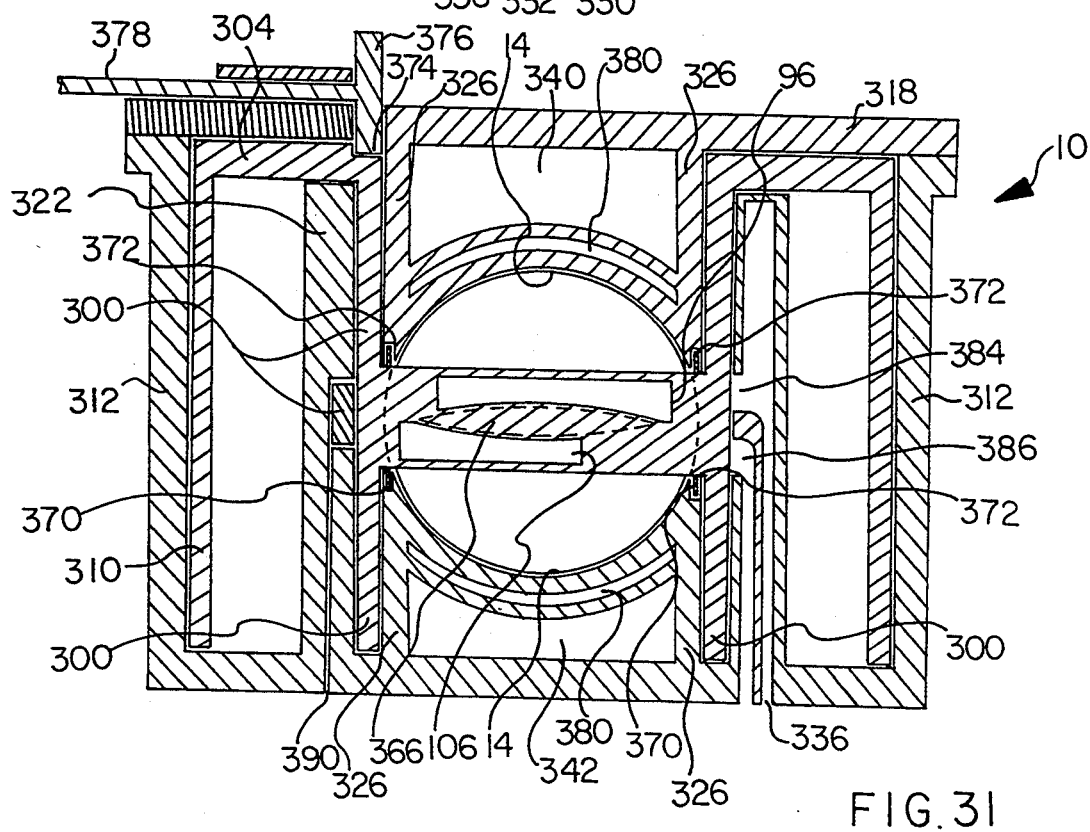
FIG. 31 is a cross-sectional side view of the engine and apparatus of FIG. 29.
Figure 32:
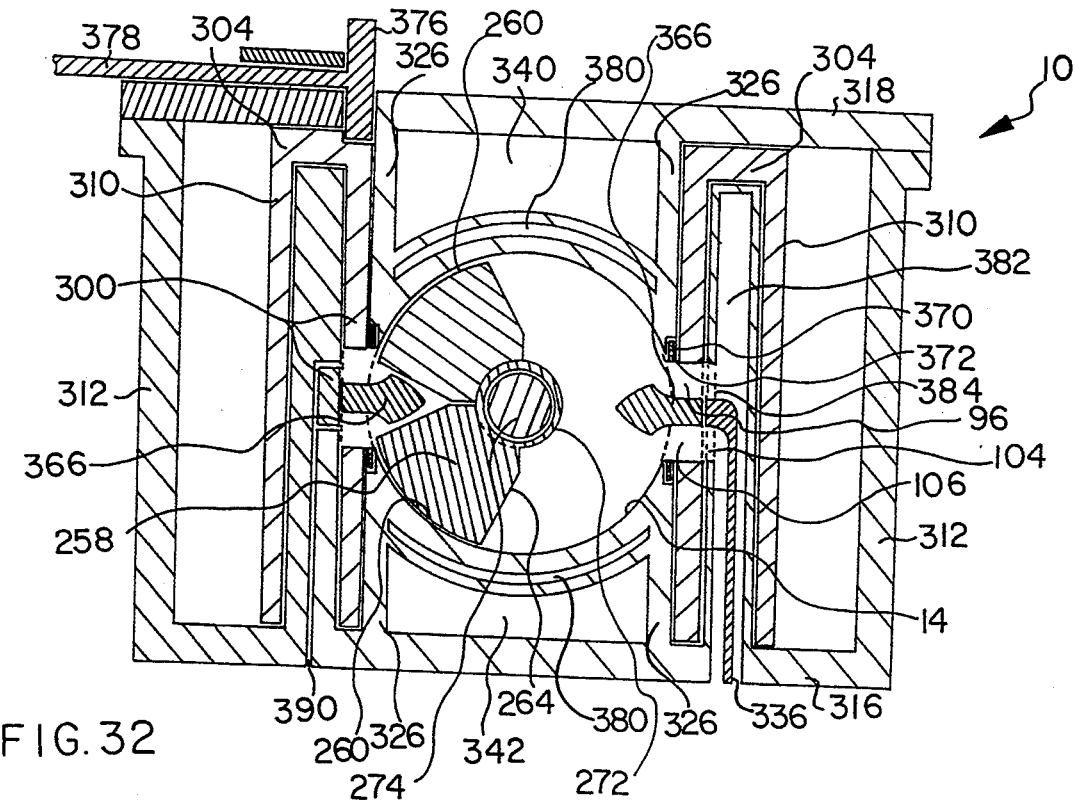
FIG. 32 is a cross-sectional side view of the engine and apparatus of FIG. 29, showing the wedge members.
Figure 33:
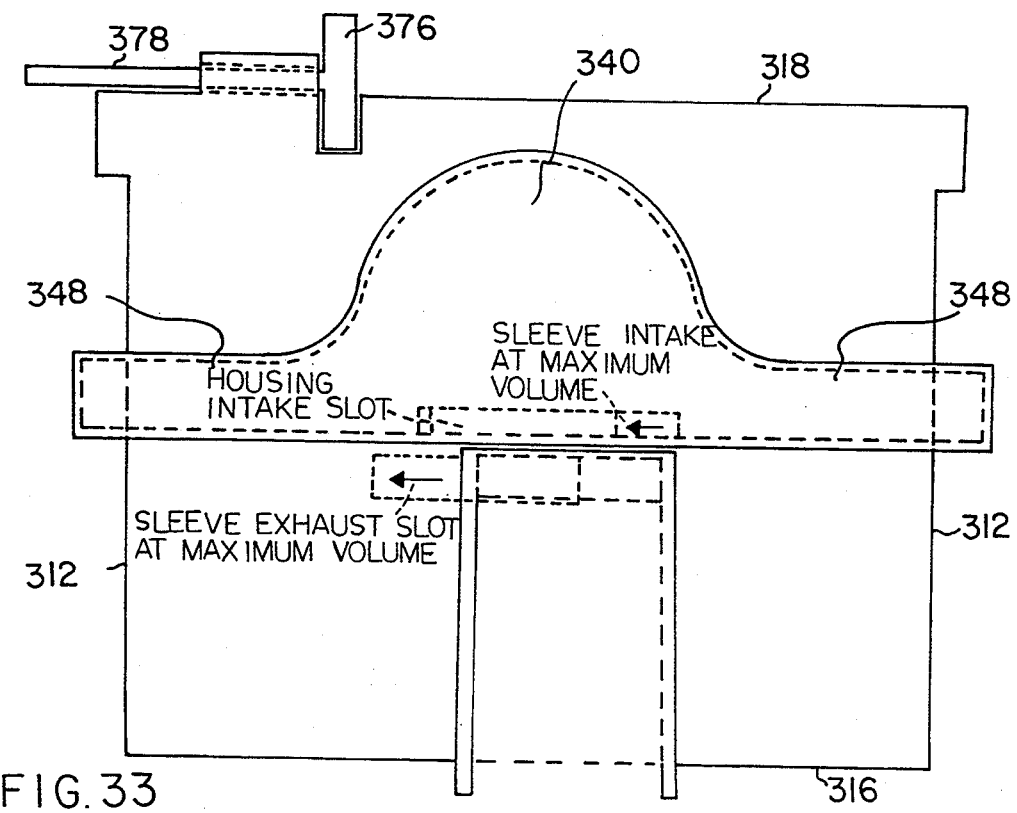
FIG. 33 is a side view of the two cycle engine and surrounding air compressing apparatus, showing the various compressed air and exhaust passageways in broken lines.
Figure 34:
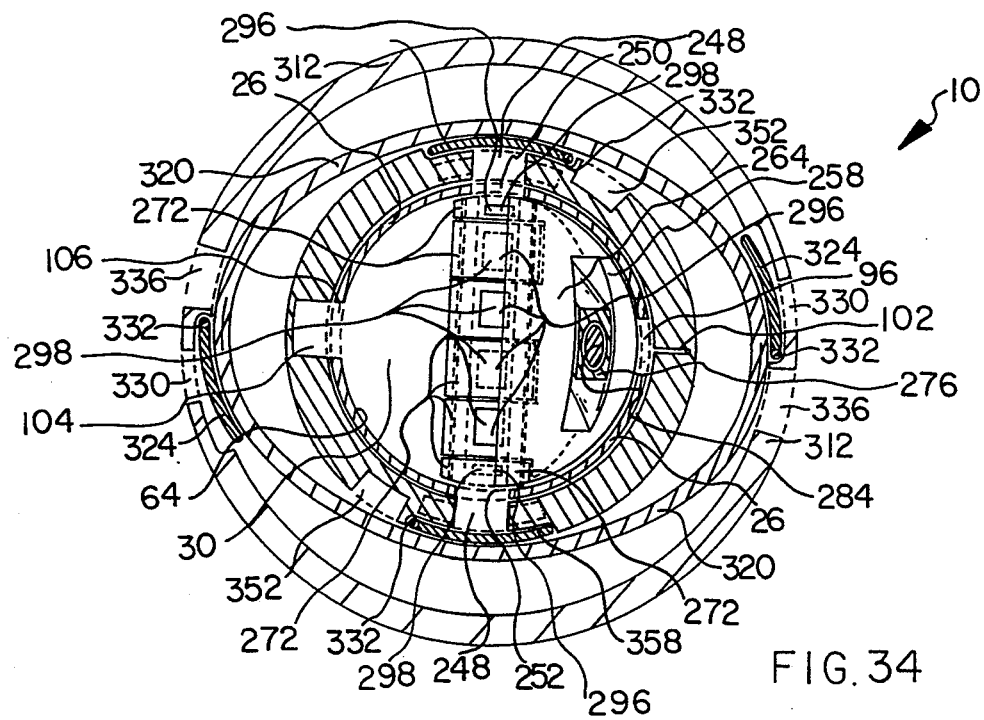
FIG. 34 is a cross-sectional top view of the two cycle engine and surrounding air compressing apparatus, incorporating the hollow air delivering hinge pin feature.
Figure 35:
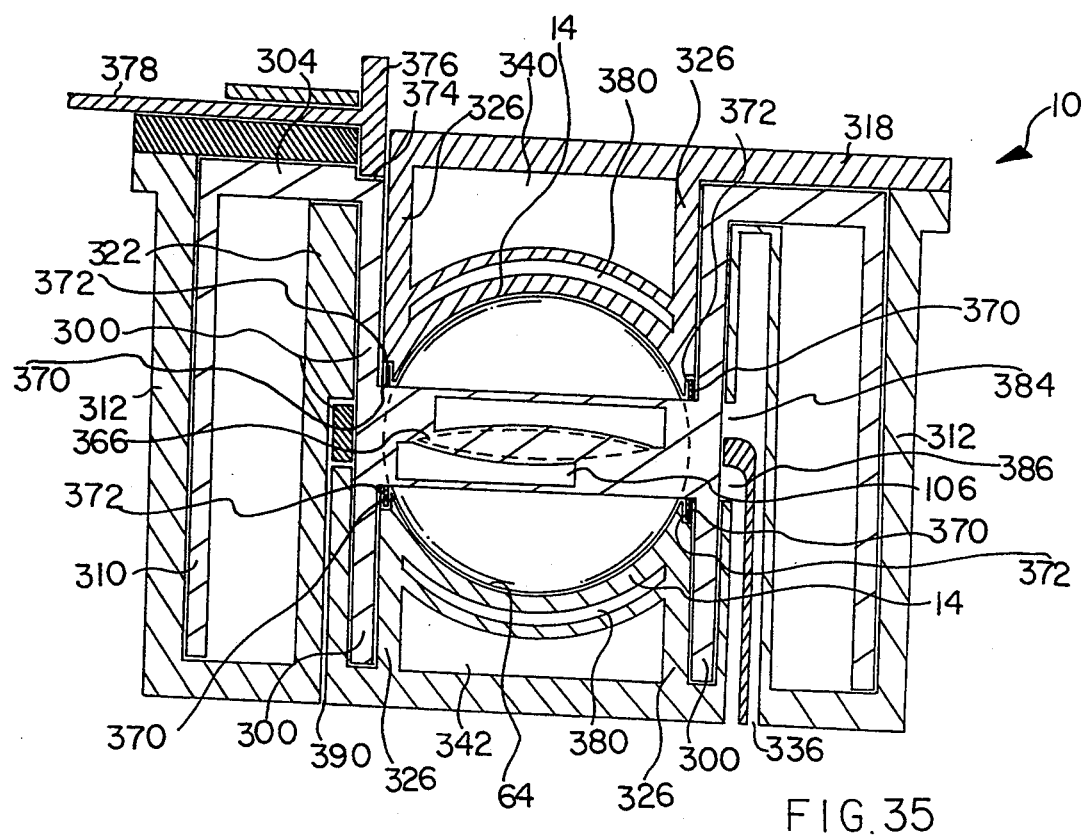
FIG. 35 is a cross-sectional side view of the engine and apparatus of FIG. 34.
Figure 36:
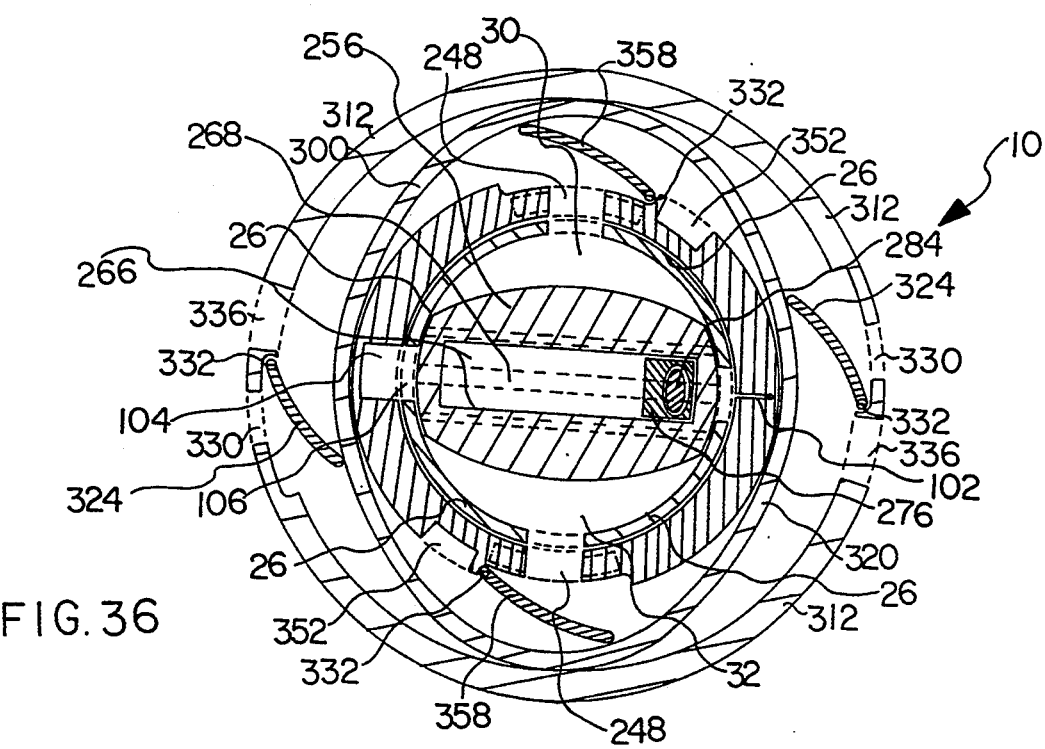
FIG. 36 is a cross-sectional top view of the two cycle engine and surrounding air compressing apparatus, as in FIG. 34, but with the positions of the elliptical wall and flap valves at 90 degrees rotation.
Figure 37:
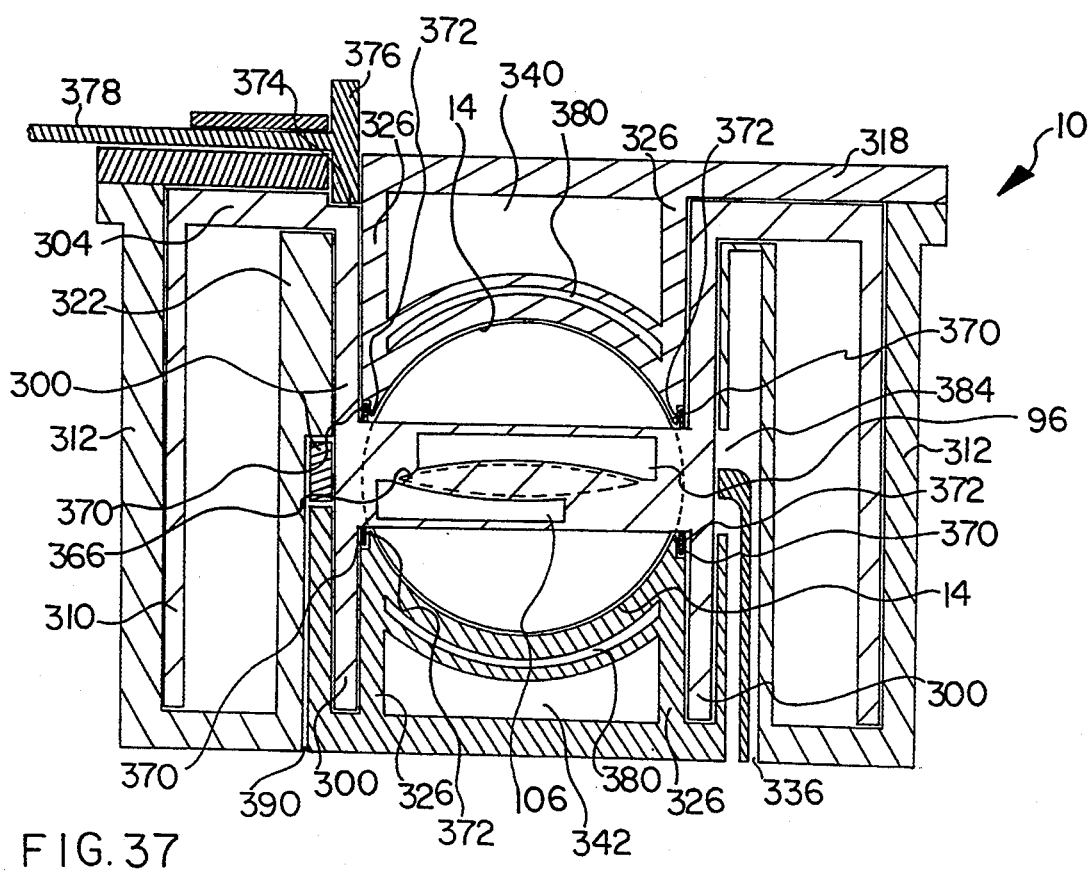
FIG. 37 is a cross-sectional side view of the engine and apparatus of FIG. 36.
Figure 38:
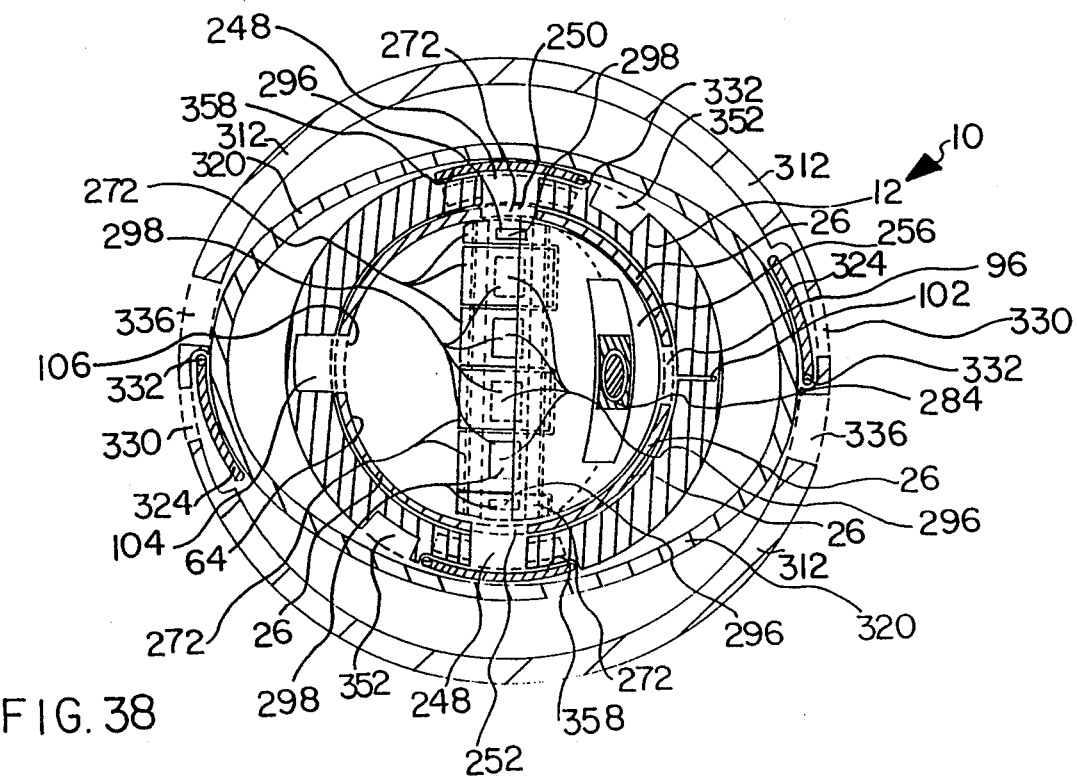
FIG. 38 is a cross-sectional top view as in FIG. 34, showing the positions of the elliptical wall and flap valves at 180 degrees rotation.
Figure 39:
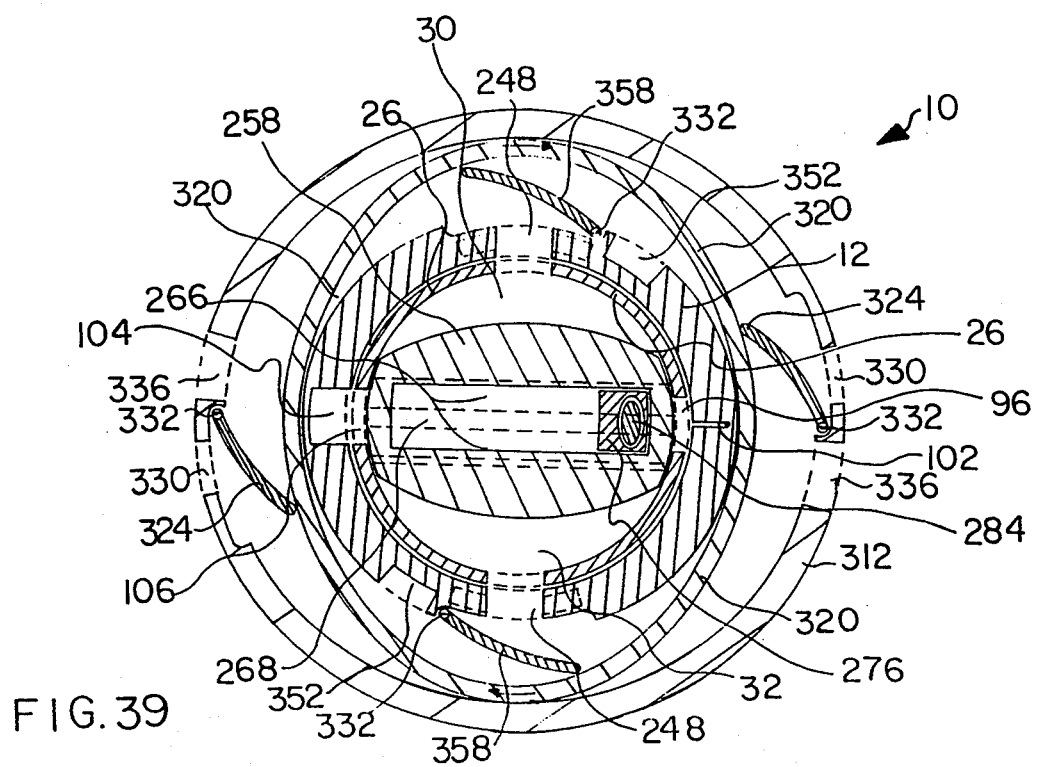
FIG. 39 is a cross-sectional side view of the engine and apparatus of FIG. 38.

There are preferably two compressed air reservoirs 340 and 342, both located within cylinder 300, the former above sphere 14 and the latter below sphere 14. See FIGS. 31 and 32. Passageways (not shown) carry compressed air from ports 330 to reservoirs 340 and 342. FIGS. 29 and 30 show the added details of a one-way air valve 382 leading to a high pressure reservoir, a lateral intake port 384 for high pressure air, a lateral exhaust outlet 386, and a fuel passageway 390 leading to fuel injectors.

Compressed air from reservoirs 340 and 342 enters the space between elliptical wall 310 and housing extension wall 322 through high pressure conduits 348 and lateral inlets 352 for delivery into sphere 14. See FIGS. 29 through 33. Inner flap valves 358 are provided on opposing sides of sphere 14 and resiliently hinge outward on torsion springs 332 to sealingly drag along the interior surface of elliptical wall 310. Beneath each inner flap valve 358 is a port 350 in wall 322 leading into sphere 14 through which compressed air is delivered. As elliptical wall 310 rotates, the air collected between one long diameter 320 end of elliptical wall 310 and housing extension wall 322 is forced through an opening inner flap valve 358 and into sphere 14. An intake slot is provided in cylinder 300 which momentarily aligns with port 350 to permit the passage of the compressed air. As the compressed air enters sphere 14, it drives and scavages out the exhaust on one side of wedges 256 and 258. The exhaust exits sphere 14 through an exhaust slot 106 in cylinder 300 which momentarily aligns with a port 350 and escapes through a lateral outlet 362.

Narrow, wedge-shaped sleeve fins 366 optionally extend from sphere wall 64 to partially fill the minimum volume between wedges 256 and 258. Their primary purposes are to direct the inflowing intake air and outflowing exhaust for more complete scavenging of the exhaust and, to enhance engine 10 strength.

Sealing rings 370 extend from an inner rim of cylinder 300, parallel with the wall of cylinder 300, into close fitting slots 372 in sphere wall 64. See FIG. 30. Rings 370, like piston rings, serve to enhance the seal of the combustion chambers.

Circular top plate 318 of housing 312 is removably attached to the remainder of housing 312 with bolts. This permits disassembly of two cycle engine 10 for servicing.

Gear teeth 374 are provided on one end of cylinder 300 which mesh with a transmission gear 376 as described above. Transmission gear 376 encircles and adjoins drive shaft 378 through which engine power is delivered.

A narrow cavity 380 is preferably provided within sphere wall 64 to contain cooling fluid. See FIG. 30. This feature permits engine 310 to be run without overheating.

The hollow hinge pin 276 alternative is preferably also employed for the two-cycle engine. See FIGS. 34 through 39, which show the complete double cycle in sequential clockwise stages 90 degrees apart. The fuel line in housing 12 to the fuel injector and the exhaust manifold in and on housing 12 from the exhaust port of housing 12 are not shown, since they extend laterally or axially through housing 12 to avoid interference with the integral air compressor. The intake manifolds in housing 12 and the intake conduits from the compressor to compressed air reservoirs 340 and 342 to the intake ports of housing 12 all extend laterally or axially in housing 12 to avoid interference with the integral compressor. There can be a variety of shapes of the intake and exhaust manifolds in spherical engine 10, just as there are a variety of shapes of intake and exhaust manifolds in piston engines.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An engine comprising:
    an engine block containing a compartment in the form of a sphere having a surface and having an equatorial zone removed to create an annular gap,
    at least one ring member slidably encircling the annular gap having an outer surface and having at least one opening to permit the passage of combustion gases and which periodically aligns with a port in the engine block,
    a hinge pin mounted within the ring member and extending through the center point of the sphere,
    a first divider member having a connecting end and a free end, the connecting end of which comprises at least one tube section which surrounds the hinge pin, and the free end of which is directed toward, abuts and conforms to the sphere surface,
    a second divider member having a connecting end and a free end, the connecting end of which comprises at least one tube section which surrounds the hinge pin, and the free end of which is directed toward, abuts and conforms to the sphere surface, and which, together with the first divider member, separates the sphere into two combustion chambers having variable volumes, such that as one combustion chamber expands the other combustion chamber correspondingly contacts,
    a slot in the surface of the free end of each divider member extending parallel to the longitudinal axis of the hinge pin,
    a fulcrum member projecting from the sphere into each slot to guide the divider members,
    ignition means mounted in the sphere to ignite a fuel air mixture within the sphere alternately on either side of the dividing members.

2. An engine according to claim 1,
    wherein the first and second dividing members are each wedge-shaped members having a narrow end and a wide end, wherein the connecting end is the narrow end and the free end is the wide end.

3. An engine according to claim 1, additionally comprising:
    a second ring member slidably surrounding the first ring member, having an outer surface and having gear teeth on the outer surface and having at least one opening which periodically aligns with an opening in the first ring member and with a port in the sphere to permit the passage of combustion gases into and out of the sphere.

4. An engine according to claim 1, additionally comprising:
means for delivering compressed air into the sphere on alternating sides of the dividers to supply oxygen needed for combustion and to drive out the products of prior combustion.

5. An engine according to claim 1, wherein the engine block includes a cavity for containing cooling fluid.

6. An engine according to claim 1 additionally comprising gear teeth on the outer surface of the ring member for transmitting engine power and torque.

7. An engine according to claim 6, additionally comprising a drive shaft fitted with a gear which engages the gear teeth on the outer surface of the ring member.

8. An engine according to claim 1, additionally comprising fin members attached to and extending from the sphere between the first and second dividers.

9. An engine according to claim 4, wherein the means for delivering compressed air comprises:
an outer housing having a cylindrical cavity with ports leading from the cylindrical cavity to the exterior of the outer housing and to a chamber for holding compressed air, and having a top end and a bottom end,
a top member for covering the top end and a bottom member for covering the bottom end of the cylindrical cavity,
a tubular extension adjoined to and extending coaxially from the ring member,
a first circular wall adjoined to and extending upward from the bottom member inside the cylindrical cavity, concentric with the cylindrical cavity, slidably surrounding the ring member tubular extension, said first circular wall having ports which periodically align with the ring member openings during ring member rotation,
engine block support means connected to the bottom member and slidably contained within the ring member tubular extension into which a first end of the engine block is mounted,
engine block support means connected to the top member and slidably contained within the ring member tubular extension into which a second end of the engine block is mounted,
an elliptical tube member fit coaxially and slidably within the cylindrical cavity having a long axis of sufficient length for the elliptical tube member to snugly fit against the inner surface of the cylindrical cavity and a short axis of a length permitting the elliptical tube member to slidably surround the circular housing wall, for rotating and thereby pushing and compressing air surrounding the elliptical tube within the cylindrical cavity,
connecting means for connecting the elliptical tube member to the ring member tubular extension,
valves in the first circular wall for regulating the flow of air through the ports in the first circular wall, which open and close with the rotation of the elliptical tube member, to permit compressed air to enter the sphere and spent combustion gases to exit the sphere,
valves in the outer housing for regulating the flow of air through the ports in the outer housing, which open and close with the rotation of the elliptical tube member, to open to permit air to enter the cylindrical cavity outside the elliptical tube member and close to prevent air from escaping while being pushed and compressed by the elliptical tube member, and to open to permit compressed air to flow into the compressed air chamber.

10. An engine according to claim 9, wherein the valves in the first circular wall and in the outer housing are flap valves having an edge which resiliently drags against the surface of the elliptical tube member as the elliptical tube member rotates.

11. An engine according to claim 9, wherein each engine block support means includes a circular cylinder support member.

12. An engine according to claim 11, wherein a compressed air chamber is contained within a circular cylinder support member.

13. An engine according to claim 9, wherein the top member is removably fastened to the outer housing to provide access to the contents of the outer housing for servicing the engine.

14. An engine according to claim 9, wherein the tubular extension has a top edge, additionally comprising gear teeth along the top edge for transmitting engine power and torque.

15. An engine according to claim 1, wherein the slot has guide walls and wherein roller bearings are provided between the outer surface of the fulcrum member and the guide walls of the slot for reducing fricton as the fulcrum member and guide walls move relative to each other.

16. An engine according to claim 1, wherein said hinge pin contains an essentially axial passageway having a passageway entrance port in fluid communication with an air source and at least one passageway exit port adjacent said at least one tube section and wherein said at least one tube section has a tube section opening which periodically aligns during the engine cycle with said at least one passageway exit port through which air for combusion is delivered into said sphere from said air source, alternately on either side of said first and second divider members.

17. An engine comprising:
an engine block containing a compartment in the form a sphere with an equatorial zone removed to create an annular gap,
at least one ring member slidably encircling the annular gap having an outer surface and having at least one opening to permit the passage of combustion gases and which periodically aligns with a port in the engine block,
a hinge pin mounted within the ring member and extending through the center point of the sphere,
a first divider member having a connecting end and a free end, the connecting end of which comprises at least one tube section which surrounds the hinge pin, and the free end of which is directed toward, abuts and conforms to the compartment wall,
a second divider member having a connecting end and a free end, the connecting end of which comprises at least one tube section which surrounds the hinge pin, and the free end of which is directed toward, abuts and conforms to the compartment wall,
a slot in the surface of the free end of each divider member extending parallel to the longitudinal axis of the hinge pin,
a fulcrum member projecting from the sphere into each slot to guide the divider members,
ignition means mounted in the sphere to ignite a fuel air mixture within the chamber alternately on either side of the dividing members.

18. An engine according to claim 17, wherein the first and second dividers are each wedge-shaped members having a narrow end and a wide end, wherein the connecting end is the narrow end and the free end is the wide end.

19. An engine according to claim 17, additionally comprising gear teeth on the outer surface of the ring member for transmitting engine power and torque.

20. An engine according to claim 19, additionally comprising a drive shaft having a gear which engages the gear teeth on the outer surface of the ring member.

21. An engine according to claim 17, wherein the slot has guide walls and wherein roller bearings are provided between the outer surface of the fulcrum member and the guide walls of the slot for reducing fricton as the fulcrum member and guide walls move relative to each other.

22. An engine according to claim 15, wherein said hinge pin contains an essentially axial passageway having a passageway entrance port in fluid communication with an air source and at least one passageway exit port adjacent said at least one tube section and wherein said at least one tube section has a tube section opening which periodically aligns during the engine cycle with said at least one passageway exit port through which air for combusion is delivered into said sphere from said air source, alternately on either side of said first and second divider members.

* * * * *